US012614265B2

(12) United States Patent
Maier et al.

(10) Patent No.: US 12,614,265 B2
(45) Date of Patent: Apr. 28, 2026

(54) COMPUTER-IMPLEMENTED METHOD FOR QUALITY CONTROL OF A DIGITAL IMAGE OF A SAMPLE

(71) Applicant: Roche Molecular Systems, Inc., Pleasanton, CA (US)

(72) Inventors: Alexander Maier, Maxdorf (DE); Jens Deppermann, Schriesheim (DE); Kai Reppin, Speyer (DE); Joost Van Duuren, Mannheim (DE)

(73) Assignee: Roche Molecular Systems, Inc., Pleasanton, CA (US)

(*) Notice: Subject to any disclaimer, the term of this patent is extended or adjusted under 35 U.S.C. 154(b) by 469 days.

(21) Appl. No.: 18/173,593

(22) Filed: Feb. 23, 2023

(65) Prior Publication Data

US 2023/0206416 A1 Jun. 29, 2023

Related U.S. Application Data

(63) Continuation of application No. PCT/EP2021/073326, filed on Aug. 24, 2021.

(30) Foreign Application Priority Data

Aug. 25, 2020 (EP) .................................... 20192675

(51) Int. Cl.
*G06T 7/00* (2017.01)
*G06T 5/20* (2006.01)
(Continued)

(52) U.S. Cl.
CPC .............. *G06T 7/0002* (2013.01); *G06T 5/20* (2013.01); *G06T 15/00* (2013.01); *G06V 10/25* (2022.01);
(Continued)

(58) Field of Classification Search
CPC ......... G06T 7/0002; G06T 5/20; G06T 15/00; G06T 2207/20084; G06T 2207/30024;
(Continued)

(56) References Cited

U.S. PATENT DOCUMENTS

| | | | |
|---|---|---|---|
| 2009/0046909 A1* | 2/2009 | Rutenberg | G06T 5/50 |
| | | | 382/128 |
| 2012/0127297 A1 | 5/2012 | Baxi et al. | |
| 2019/0197362 A1 | 6/2019 | Campanella et al. | |

FOREIGN PATENT DOCUMENTS

| | | |
|---|---|---|
| CN | 109313352 A | 2/2019 |
| JP | 2015108837 A | 6/2015 |

(Continued)

OTHER PUBLICATIONS

Hosseini Mahdi S et al: "Focus Quality Assessment of High Throughput Whole Slide Imaging in Digital Pathology", IEEE Transactions on Medical Imaging, IEEE Service Center, Piscataway, NJ, US, vol. 39, No. 1, Jan. 1, 2020 (Jan. 1, 2020), pp. 62-74. (Year: 2019).*

(Continued)

*Primary Examiner* — Jennifer Mehmood
*Assistant Examiner* — Dustin Bilodeau
(74) *Attorney, Agent, or Firm* — Kilpatrick Townsend & Stockton LLP

(57) ABSTRACT

A computer-implemented method for quality control of at least one digital image of a sample (112) mounted on a slide (114) is proposed. The method comprises the following actions:
    a) Providing at least one digital image of the sample (112) mounted on the slide (114) using at least one imaging device (116) of a slide imaging apparatus (110);
    b) Determining quality of the digital image by determining sharpness values of sub-regions of at least one region of interest of the digital image by using at least (Continued)

one edge detection image filter and comparing the sharpness values within the region of interest, wherein the quality of the region of interest is classified depending on the comparison;

c) Generating at least one indication depending on the classification of the quality, wherein actions b) and c) are performed automatically.

20 Claims, 9 Drawing Sheets

(51) Int. Cl.

| | |
|---|---|
| *G06T 15/00* | (2011.01) |
| *G06V 10/25* | (2022.01) |
| *G06V 10/56* | (2022.01) |
| *G06V 10/764* | (2022.01) |
| *H04N 23/67* | (2023.01) |

(52) U.S. Cl.

CPC ............ *G06V 10/56* (2022.01); *G06V 10/764* (2022.01); *H04N 23/67* (2023.01); *G06T 2207/20084* (2013.01); *G06T 2207/30024* (2013.01); *G06T 2207/30168* (2013.01)

(58) Field of Classification Search

CPC . G06T 2207/30168; G06T 2207/20021; G06T 2207/20081; G06T 2207/10056; G06V 10/25; G06V 10/56; G06V 10/764; H04N 23/67

See application file for complete search history.

(56) References Cited

FOREIGN PATENT DOCUMENTS

| | | |
|---|---|---|
| WO | 2017102827 A1 | 6/2017 |
| WO | 2022043289 A1 | 3/2022 |

OTHER PUBLICATIONS

Hosseini Mahdi S et al: "Encoding Visual Sensitivity by MaxPol Convolution Filters for Image Sharpness Assessment", IEEE Transactions on Image Processing, IEE Service Center, Piscataway, NJ, US, vol. 28, No. 9, Sep. 1, 2019 ( Sep. 1, 2019), pp. 4510-4525. (Year: 2019).*

Samuel J Yang et al: "Assessing microscope image focus quality with deep learning", BMC Bioinformatics, Biomed Central Ltd, London, UK, vol. 19, No. 1, Mar. 15, 2018 (Mar. 15, 2018), pp. 1-9, XP021254534, DOI: 10.1186/S12859-018-2087-4 (Year: 2018).*

Hosseini, et al., "Encoding Visual Sensitivity by MaxPol Convolution Filters for Image Sharpness Assessment", IEEE Transactions on Image Processing, IEE Service Center, Sep. 1, 2019, 15 pages.

Hosseini, et al., "Focus Quality Assessment of High-Throughput Whole Slide Imaging in Digital Pathology", IEEE Transactions on Medical Imaging, vol. 39, Issue 1, Jan. 1, 2020, pp. 62-74.

Jansen, et al., "Histopathology: ditch the slides, because digital and 3D are on show", World Journal of Urology (2018) 36:549-555.

Janowczyk, et al., "HistoQC: An Open-Source Quality Control Tool for Digital Pathology Slides.", JCO Clinical Cancer Informatics (2019); 3: 1-7.

Kohlberger, et al., "Whole-Slide Image Focus Quality: Automatic Assessment and Impact on AI Cancer Detection", Journal of Pathology Informatics (2019), vol. 10, Issue 1, 1-13.

Liu, et al., "Artificial Intelligence-Based Breast Cancer Nodal Metastasis Detection", Arch Pathol Lab Med (2019) vol. 143, 859-868.

Yang et al., "Assessing Microscope Image Focus Quality with Deep Learning", BMC Bioinformatics, Biomed Central Ltd, vol. 19, No. 77, Mar. 15, 2018, 9 pages.

Application No. PCT/EP2021/073326, International Search Report and Written Opinion, Mailed On Nov. 8, 2021, 11 pages.

* cited by examiner

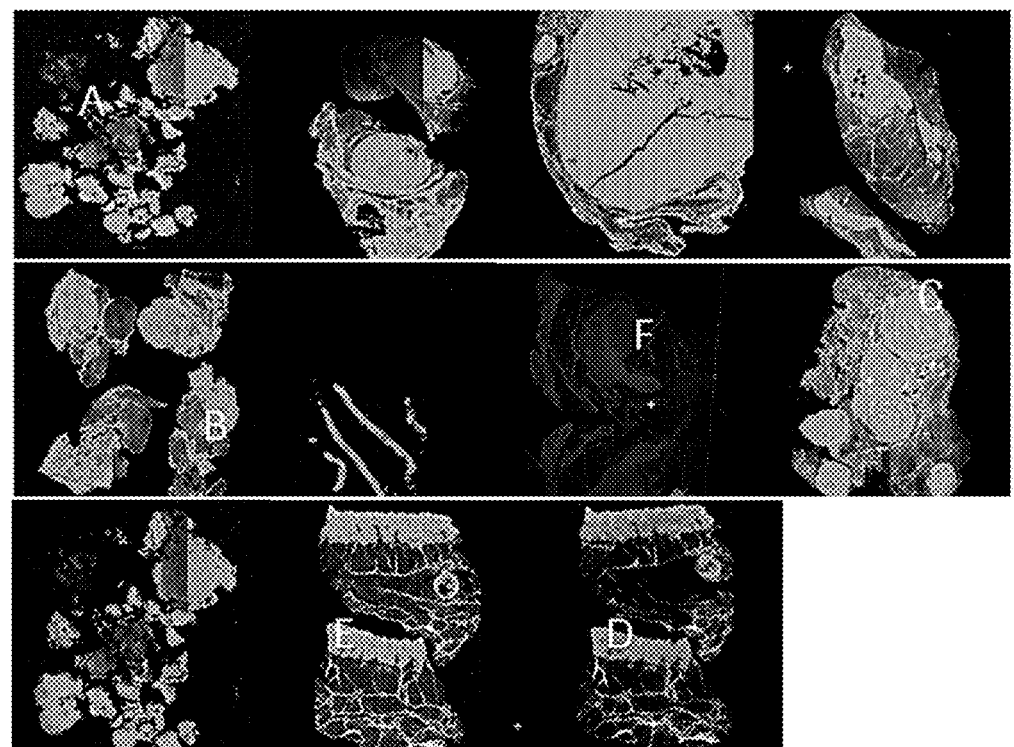
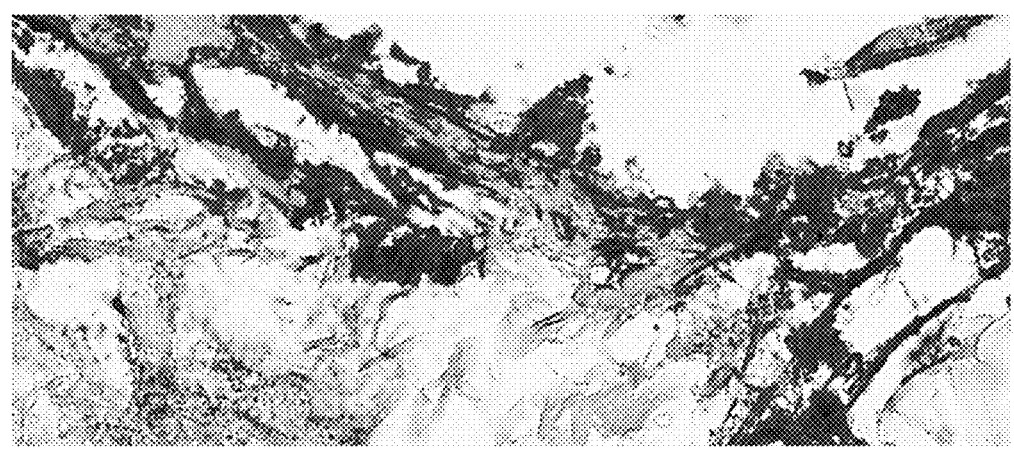
Fig. 4
Fig. 4 A
Fig. 4 B

COMPUTER-IMPLEMENTED METHOD FOR QUALITY CONTROL OF A DIGITAL IMAGE OF A SAMPLE

CROSS-REFERENCE TO RELATED APPLICATIONS

The present application is a continuation of International Application No. PCT/EP2021/073326, filed on Aug. 24, 2021, which claims priority from European Patent Application No. 20192675.5 filed on Aug. 25, 2020, the contents of each of which are incorporated herein by reference in their entireties.

FIELD

The present disclosure relates to a computer-implemented method for quality control of at least one digital image of a sample, a computer-implemented method for determining focus quality for determining at least one digital image of a sample mounted on a slide, a computer-implemented method for determining a three-dimensional digital image of a sample mounted on a slide using at least one imaging device of a slide imaging apparatus, a computer-implemented method for training a machine and deep learning model for analyzing at least one digital image of a sample mounted on a slide and a slide imaging apparatus. Herein, the devices and methods can be used in digital pathology; however, further uses are feasible.

BACKGROUND

A plurality of methods and devices for analyzing digital images for digital pathology (e.g., digitization of tissue slides) are known. Several problems may ar'se with respect to analyzing digital images for digital pathology.

Specifically, in order to precisely analyze artifacts in digital images, an integrated automatic analysis for a clinical digital workflow for computational pathology is required.

To avoid errors, out-of-focus areas in known techniques are flagged, because they hinder classification using algorithms. For flagging out-of-focus areas, the digital images are be manually reviewed by laboratory professionals. This is time consuming. Regional out-of-focus areas are particularly difficult to detect, because the slides need to be reviewed at a high magnification (e.g., 40× magnification).

Janowczyk A, Zuo R, Gilmore H, Feldman M, Madabhushi A. HistoQC: "An Open-Source Quality Control Tool for Digital Pathology Slides", JCO Clin Cancer Inform. 2019; 3:1-7 describes a tool for performing quality control to identify and delineate artifacts and to discover cohort-level outliers. This tool uses a combination of image metrics (e.g., color histograms, brightness, contrast), features (e.g., edge detectors) and supervised classifiers (e.g., pen detection) to identify artifact-free regions on digitized slides. Generally, as outlined above, automatic tools for analyzing digital images require sharp images such as quality control is necessary to ensure that the algorithm can process the digital image in a manner so as to produce meaningful results. Two approaches are taken into account for the current measurements for defining sharpness: the Michelson contrast and the RMS contrast. The applied image settings, features and supervised classifiers offer quality control of digital images. However, these strategies are based on a mixed signal, result not directly defining applicability of algorithms.

Moreover, it is known that multiple depths of focus, so-called z-stacking, have different effects in on out-offocus. (See Kohlberger T, Liu Y, Moran M, et al. "Whole-Slide Image Focus Quality: Automatic Assessment and Impact on AI Cancer Detection", J Pathol Inform, 2019.) However, this approach increases the scan time and file size to an impractical extent. Moreover, however, it may be difficult to classify images that are generally out-of-focus. Generally, the setting of a focus coil to a nominal position can be checked by using graphics algorithms. However, these approaches still may leave room for interpretation.

Moreover, 3D perspectives for digital pathology and/or tangential sectioning may be informative beyond individual traditional 2D perspectives. A 3D approach provides an improved insight in architectural features and special arrangements. Different attempts have been made to reconstruct 3D images from 2D images. The majority is based on manual segmentations of slides, which is quite a laborious task. (See e.g. Jansen I, Lucas M, Savci-Heijink C D, et al. "Histopathology: ditch the slides, because digital and 3D are on show", World J Urol. 2018; 36(4):549-555. Doi:10.1007/s00345-018-2202-12.) In addition to the labor-intensive process, problems in the current literature cause limiting factors for the use of this technology. High-resolution 3D data sets are difficult to visualize. It is therefore generally considered to be highly important to minimize the part of the data set shown and to avoid low out-of-plane resolutions.

Out-of-focus areas negatively influence the accuracy of an algorithm's performance. When the degree of out-of-focus is high prior to pathologist review, the slides are traditionally re-scanned, see e.g. Liu Y, Kohlberger T, Norouzi M, Dahl G E, Smith J L, Mohtashamian A, et al. "Artificial Intelligence-Based Breast Cancer Nodal Metastasis Detection. Arch Pathol Lab Med. 2018". To train an algorithm, training data is typically constructed to depict a variety of tissue morphologies. To train the algorithm to recognize out-of-focus areas, such artifacts are often simulated using real in-focus images via synthetic Gaussian blurring or Bokeh blurring. Kohlberger et al. 2019 showed that by adding poison noise or JPEG artifacts, the out-of-focus regions can be even more realistic, thereby offering a great tool for training algorithms. However, even if applying this approach, it may not be possible to obtain robust and reliable results using an automatic algorithm in the case of out-of-focus portion of the image, and thus—frequently, it may be determined (by a developer or via evaluating a condition of a stored rule) to not use the algorithm in this circumstance.

Thus, despite the achievements of the above-mentioned techniques, there is still a need for enhancing quality of digital images and of automatic analysis of digital images for computational pathology.

SUMMARY

Some embodiments of the present invention provide a computer-implemented method that facilitate quality control of at least one digital image of a sample. The computer-implemented method can include determining focus quality for determining at least one digital image of a sample mounted on a slide; determining a three-dimensional digital image of a sample mounted on a slide using at least one imaging device of a slide imaging apparatus; and/or training a machine and deep learning model for analyzing at least one digital image of a sample mounted on a slide and a slide imaging apparatus. Various embodiments of the present invention can at least partially avoid the shortcomings of known devices and methods of this kind and which at least partially address the above-mentioned challenges. Specifically, quality of digital images and of automatic analysis of digital images for computational pathology shall be improved.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a computer-implemented method for quality control of at least one digital image of a sample mounted on a slide is proposed.

The term "computer-implemented", as used herein, is a broad term and is to be given its ordinary and customary meaning to a person of ordinary skill in the art and is not to be limited to a special or customized meaning. The term specifically may refer, without limitation, to a process which is fully or partially implemented by using a data processing means, such as data processing means comprising at least one processing unit. The term "computer", thus, may generally refer to a device or to a combination or network of devices having at least one data processing means such as at least one processing unit. The computer, additionally, may comprise one or more further components, such as at least one of a data storage device, an electronic interface or a human-machine interface.

The term "processing unit", as used herein, is a broad term and is to be given its ordinary and customary meaning to a person of ordinary skill in the art and is not to be limited to a special or customized meaning. The term specifically may refer, without limitation, to an arbitrary logic circuitry configured for performing basic operations of a computer or system, and/or, generally, to a device which is configured for performing calculations or logic operations. In particular, the processing unit may be configured for processing basic instructions that drive the computer or system. As an example, the processing unit may comprise at least one arithmetic logic unit (ALU), at least one floating-point unit (FPU), such as a math coprocessor or a numeric coprocessor, a plurality of registers, specifically registers configured for supplying operands to the ALU and storing results of operations, and a memory, such as an L1 and L2 cache memory. In particular, the processing unit may be a multi-core processor. Specifically, the processing unit may be or may comprise a central processing unit (CPU). Additionally or alternatively, the processing unit may be or may comprise a microprocessor, thus specifically the processing unit's elements may be contained in one single integrated circuitry (IC) chip. Additionally or alternatively, the processing unit may be or may comprise one or more application specific-integrated circuits (ASICs) and/or one or more field-programmable gate arrays (FPGAs) or the like.

The term "sample", as used herein, is a broad term and is to be given its ordinary and customary meaning to a person of ordinary skill in the art and is not to be limited to a special or customized meaning. The term may, specifically, refer, without limitation, to a biological specimen, such as a tissue sample. The sample may be or may comprise a biological material such as a tissue or a smear. However, other kinds of samples may also be feasible.

The term "slide", as used herein, is a broad term and is to be given its ordinary and customary meaning to a person of ordinary skill in the art and is not to be limited to a special or customized meaning. The term may, specifically, refer, without limitation, to a substrate which is designated for a sample to be mounted on a surface of the slide. In particular for a purpose of carrying the sample without any changes during the processing to the slide, the substrate is mechanically stable and can, therefore comprise any material which provides sufficient mechanical stability. In particular, for a purpose of carrying a biological specimen, the substrate may exhibit a surface which is configured to be compatible with biological material. By way of example, the slide is a glass slide since glass is known, on one hand, to provide sufficient mechanical stability and, on the other hand, to have a high compatibility with biological material. However, further kinds of materials for the slides may also be feasible. For a purpose of generating the desired image of the sample, the slide may be a plate having a 2D extension and a thickness, wherein the 2D extension of the plate may exhibit a rectangular or circular form, and wherein the thickness of the plate may be small compared to a size of the extension (e.g., 20% or less, 10% or less, 5% or less than a measure for a linear extent of the 2D extension of the plate).

Further, the slide may, in particular, have a form that may enable imaging of the sample mounted on the slide. The terms "imaging" or "generate an image", as used herein, are broad terms and are to be given their ordinary and customary meaning to a person of ordinary skill in the art and are not to be limited to a special or customized meaning. The terms may, specifically, refer, without limitation, to providing a 2D two-dimensional representation of at least one property of the sample, also denoted by the term "image", which can typically, be processed and displayed on a screen for being regarded by eyes of a viewer (e.g., without any further aids, apart from eyeglasses of the viewer). For this purpose an imaging device as disclosed in more detail below is, typically, used. The term "digital image", as used herein, is a broad term and is to be given its ordinary and customary meaning to a person of ordinary skill in the art and is not to be limited to a special or customized meaning. The term specifically may refer, without limitation, to a discrete and discontinuous representation of the image. Thus, the term "digital image" may refer to a two-dimensional function, f(x,y), wherein intensity and/or color values are given for any x, y-position in the digital image, wherein the position may be discretized corresponding to recording pixels of the digital image.

The term "quality", as used herein, is a broad term and is to be given its ordinary and customary meaning to a person of ordinary skill in the art and is not to be limited to a special or customized meaning. The term specifically may refer, without limitation, to a state of the digital image relating to suitability for being automatically analyzed. Specifically, the term "quality" refers to an indication of an amount of sharpness or blurriness or out-of-focus of the digital image.

The term "sharpness", as used herein, is a broad term and is to be given its ordinary and customary meaning to a person of ordinary skill in the art and is not to be limited to a special or customized meaning. The term specifically may refer, without limitation, to a measure of resolution and acutance. Specifically, sharpness may refer to a property of the digital image indicating separability and/or distinguishability of different regions of the digital image by using one or more of color value, gray scale, intensity, luminance. The sharpness may relate to contrast between regions of the digital images, (e.g., difference or change in luminance and/or color value of the regions).

The term "quality control", as used herein, is a broad term and is to be given its ordinary and customary meaning to a person of ordinary skill in the art and is not to be limited to a special or customized meaning. The term specifically may refer, without limitation, to monitoring and/or determining sharpness of the digital image and/or of at least one region of interest of the digital image.

The computer-implemented method may include one or more of the following actions, which may be performed in the given order. However, a different order may also be possible. Further, one or more than one or even all of the actions may be performed once or repeatedly. Further, the actions may be performed in a timely overlapping fashion or even in parallel. The method may further comprise additional actions which are not listed.

The method may include one or more of the following actions:

a) Providing at least one digital image of the sample mounted on the slide using at least one imaging device of a slide imaging apparatus;

b) Determining quality of the digital image by determining sharpness values of sub-regions of at least one region of interest of the digital image by using at least one edge detection image filter and comparing the sharpness values within the region of interest, wherein the quality of the region of interest is classified depending on the comparison;

c) Generating at least one indication depending on the classification of the quality, wherein actions b) and c) are performed automatically.

The term "providing the digital image", as used herein, is a broad term and is to be given its ordinary and customary meaning to a person of ordinary skill in the art and is not to be limited to a special or customized meaning. The term specifically may refer, without limitation, to imaging and/or generating the at least one digital image.

The term "slide imaging apparatus", as used herein, is a broad term and is to be given its ordinary and customary meaning to a person of ordinary skill in the art and is not to be limited to a special or customized meaning. The term may, specifically, refer, without limitation, to an arbitrary device configured for imaging the sample mounted on the slide. Further, the terms "apparatus" and "slide imaging apparatus", as used herein, are broad terms and are to be given their ordinary and customary meaning to a person of ordinary skill in the art and are not to be limited to a special or customized meaning. The terms may, specifically, refer, without limitation, to a device having a plurality of components as disclosed below in more detail.

The slide imaging apparatus can include the at least one imaging device. The term "imaging device", as used herein, is a broad term and is to be given its ordinary and customary meaning to a person of ordinary skill in the art and is not to be limited to a special or customized meaning. The term may, specifically, refer, without limitation, to a device which is designated for generating a 2D representation of at least one visual property of the sample. In particular, the imaging device may be selected from a 2D camera or a line scan detector. However, further kinds of imaging devices may also be feasible.

The slide imaging apparatus may comprise a storage device which is loadable with a plurality of slides and configured for storing the slides. The term "storage device", as used herein, is a broad term and is to be given its ordinary and customary meaning to a person of ordinary skill in the art and is not to be limited to a special or customized meaning. The term may, specifically, refer, without limitation, to a slide repository which is designated for receiving an individual slide holder or, alternatively, more than one slide holder simultaneously, wherein each slide holder is configured to hold more than one slide. The storage device may be selected from a slide tray or a slide rack, however, further types of storage devices may also be feasible. The storage device may be loadable with the at least one slide (e.g., in a manual fashion), wherein, however, an automatic loading of the storage device may also be conceivable.

The slide imaging apparatus may comprise a supply device which is configured to supply the at least one slide from the storage device to the imaging device. The term "supply device", as used herein, is a broad term and is to be given its ordinary and customary meaning to a person of ordinary skill in the art and is not to be limited to a special or customized meaning. The term may, specifically, refer, without limitation, to a device which is configured to transfer the slide from the storage device to the imaging device. For this purpose, the supply device may comprise a robotic arm.

The term "region of interest", as used herein, is a broad term and is to be given its ordinary and customary meaning to a person of ordinary skill in the art and is not to be limited to a special or customized meaning. The term may, specifically, refer, without limitation, to an arbitrary shaped region or area of the digital image to be analyzed. The region of interest may be the whole digital image or a section of the digital image. The region of interest may be a region of the image comprising or suspected to comprise at least one feature to be analyzed. The digital image may be a pixelated image comprising a plurality of pixels, e.g. arranged in an array of pixels, such as a rectangular array, having m rows and n columns, with m, n, independently, being positive integers. The region of interest may be or may comprise a group of pixels comprising an arbitrary number of pixels. The term "sub-region", as used herein, is a broad term and is to be given its ordinary and customary meaning to a person of ordinary skill in the art and is not to be limited to a special or customized meaning. The term may, specifically, refer, without limitation, to an arbitrary part or element, in particular image elements, of the region of interest comprising at least one pixel or a group of pixels. The sub-regions may be square areas of the region of interest. The region of interest may comprise a plurality of sub-regions, such as a plurality of pixels.

The term "edge", as used herein, is a broad term and is to be given its ordinary and customary meaning to a person of ordinary skill in the art and is not to be limited to a special or customized meaning. The term may, specifically, refer, without limitation, to an area of the digital image at which intensity and/or color value has local changes and/or discontinuities.

The term "edge detection image filter", as used herein, is a broad term and is to be given its ordinary and customary meaning to a person of ordinary skill in the art and is not to be limited to a special or customized meaning. The term may, specifically, refer, without limitation, to at least one image processing tool configured for identifying edges in the region of interest. The edge detection image filter may be a Laplace filter. The Laplace filter may be based on second derivative of intensity and/or color value and, thus, may determine local extrema. The edge detection image filter may be configured for edge detection based on local extrema. In particular, the edge detection filter may emphasize strong edges and/or gradients. Specifically, the method may comprise defining a sub-region level (e.g., at a pixel level), the sharpness of the digital image based on one parameter defined by the Laplace filter. The edge detection filter may be configured for assigning a gray value to each of the sub-regions depending on the respective local extremum. Using the Laplace filter may be advantageous since there is no need to rotate the kernel to get x or y directions like it is required with first derivate filters like Sobel or Canny filters.

Embodiments of the present invention include using a Laplacian filter as an edge and/or gradient filter to define the sharpness. Using a Laplacian filter for defining sharpness was not proposed before, since the Laplacian filters are derivative filters that are usually used to find areas of rapid change in images. For other applications such as image processing, e.g., in edge detection and motion estimation applications, discrete Laplace operator are widely use, but not for defining sharpness and comparison of the sharpness values within the region of interest.

The term "sharpness value", as used herein, is a broad term and is to be given its ordinary and customary meaning to a person of ordinary skill in the art and is not to be limited to a special or customized meaning. The term may, specifically, refer, without limitation, to a local extremum of intensity and/or color value. The sharpness value may further refer to a color gradient or intensity gradient.

The term "comparing the sharpness values", as used herein, is a broad term and is to be given its ordinary and customary meaning to a person of ordinary skill in the art and is not to be limited to a special or customized meaning. The term may, specifically, refer, without limitation, to a process of comparing the local extrema of the sub-regions of the region of interest. The method may comprise determining a maximum local extremum of the region of interest. The maximum local extremum may be the highest local extremum of the sub-regions of the region of interest. The method may comprise a minimum local extremum of the region of interest. The minimum local extremum may be the lowest local extremum of the sub-regions of the region of interest. The method may comprise sorting the local extrema of the sub-regions in descending order starting with the maximum local extremum to the minimum local extremum. However, ascending sorting may be possible, too. The comparison may comprise at least one mathematical operation for determining relations of the local extrema.

The quality of the region of interest is classified depending on the comparison. The maximum local extremum may be classified as highest sharpness. The minimum local extremum may be classified as lowest sharpness. The local extrema of the sub-regions may be classified in descending order starting with the maximum local extremum to the minimum local extremum.

The method may further comprise setting an out-of-focus threshold. The term "out-of-focus threshold", as used herein, is a broad term and is to be given its ordinary and customary meaning to a person of ordinary skill in the art and is not to be limited to a special or customized meaning. The term may, specifically, refer, without limitation, to a threshold defining a minimum value for the maximum local extremum. For example, the out-of-focus threshold may be set to a high quality absolute sharpness which may be achieved in 99% of a set of controlled images as the minimum value for the maximum local extremum. In case the determined maximum local extremum of the region of interest is below the out-of-focus threshold the digital image may be rejected and/or classified as low quality. Using the out-of-focus threshold may allow preventing completely out-of-focus digital images from not being recognized.

As outlined above, the method may include the action of generating the at least one indication depending on the classification of the quality. The term "indication", as used herein, is a broad term and is to be given its ordinary and customary meaning to a person of ordinary skill in the art and is not to be limited to a special or customized meaning. The term may, specifically, refer, without limitation, to an output such as a visualization of the quality of the region of interest. For example, the indication may be a graphical indication comprising a heating map, also denoted focus map. The heating map may be generated by mapping the sharpness values of the sub-regions as a function of their image coordinates.

The generating of the heating map may comprise assigning a color value of a color space to each of the sharpness values. For example, the color space may be the RGB color space. The RGB color space may be a color space having three color channels, e.g., one for red (R), one for green (G) and one blue (B). The color space may range from white 255 for high quality to black 0 for out-of-focus. Thus, the maximum value of 255 in white may represent the sharpest part of the digital image. The heating map may comprise only one or two colors such as only red and yellow color values with white 255 for high quality to black 0 for out-of-focus.

For example, the sub-regions may correspond to pixels of the digital image. The generating of the heating map may comprise selecting groups of pixels of the region of interest, determining an average sharpness value for each of the groups of pixels of the region of interest and mapping the average sharpness value as a function of their image coordinates.

Specifically, the generating of the heating map may comprise determining an average gray value within groups of pixels. The average gray value may be determined by calculating a sum of all gray values divided by the number of sub-regions of the image region, in particular the number of pixels. For calculating the average gray value, black pixels may not be included or discarded. Black pixels may be pixels without any tissue contrast which cannot be sharp or blurred. Thus, the term pixel may refer to descriptive measurement values.

The determined quality based on the sharpness values may have a direct link to the applicability of classification algorithms used for computational pathology. For example, the digital image can be further evaluated using at least one classification algorithm in case the quality of the sub-regions of the digital image is above a pre-defined threshold. For example, the pre-defined threshold may be 15% of the maximum sharpness value. For example, the digital image can be further evaluated using at least one classification algorithm in case the percentage out-of-focus of the sub-regions of the digital image is below a pre-defined threshold. For example, the pre-defined threshold may be up to 10% of the whole slide image. The generated indication may allow identifying artifacts due to staining, tissue folding, and blurriness.

The method may comprise displayed the indication, in particular the heating map, by using at least one user interface. The term "user interface", as used herein, is a broad term and is to be given its ordinary and customary meaning to a person of ordinary skill in the art and is not to be limited to a special or customized meaning. The term specifically may refer, without limitation, to a human-machine interface configured for displaying the indication such as a display, a screen and the like.

The method may comprise automatically ordering of new scans if necessary. In particular, in case of the heating map shows artifacts or blurring in unwanted image positions the method may comprise automatically repeating method actions a) to c).

The method may be performed automatically (e.g., completely automatic without any manual actions or user inter-action). However, embodiments may be feasible wherein action a) comprises manual actions such as loading the sample and the like as outlined above. Thus, at least action b) of determining the quality of the digital image and action c) of generating the indication are performed fully automati-cally. The completely automatic determining of the quality and generating of the indication may be superior in identi-fying out-of-focus regions and artifacts in comparison to control of the digital image with human eyes.

Actions b) and c) may be performed using at least one controlling and evaluation device. As further used herein, the term "controlling and evaluation device" generally refers to an arbitrary device configured for performing the named operations (e.g., by using at least one data processing device and/or by using at least one processor and/or at least one application-specific integrated circuit). Thus, as an example, the at least one controlling and evaluation device may comprise at least one data processing device having a software code stored thereon comprising a number of com-puter commands. The controlling and evaluation device may provide one or more hardware elements for performing one or more of the named operations and/or may provide one or more processors with software running thereon for perform-ing one or more of the named operations. The controlling and evaluation device may comprise one or more program-mable devices such as one or more computers, application-specific integrated circuits (ASICs), Digital Signal Proces-sors (DSPs), or Field Programmable Gate Arrays (FPGAs) which are configured to perform actions b) and c). Addi-tionally or alternatively, however, the controlling and evalu-ation device may also fully or partially be embodied by hardware.

For example, the quality control as described in embodi-ments of the present invention may be performed as follows. A digital image with a width of less than 12,000 pixels may be selected from the image pyramid. From the RGB color space, only red color channel values may be taken. A binomial smoothing filter, which is an approximation of a Gaussian filter, may be applied to eliminate small high-frequency interference by converting the intensity and or color value of pixels, e.g. with a filter size of 7*7 pixels. In a next action, the Laplace filter based on the second deriva-tive may be applied for edge detection considering 8 con-nected pixels (3×3 pixels) in the neighborhood. For the heating map, red color channel values of the RGB color space may be taken, with white 255 for the sharpest part of the image to black 0 for out-of-focus or no information at all. An out-of-focus sub-region may be defined based on a predefined threshold of 12% of the maximum sharpness value. The subregion exists out of directly related n pixels, which may be in relation to their neighborhood considering 8 connected pixels. In order to avoid unsharp areas that are too small, a threshold value of 1.5% of the total amount of pixels may be set, which can be calculated by converting the number of pixels n into a percentage of the total number of pixels in the image.

The method for quality control according to embodiments of the present invention may allow determining sharpness of the digital image. Thus, the digital images can be flagged when they are out-of-focus to avoid one or more of missing blurred areas, delays because of bad slide images, and a manual pre-scan of the digital images. The method for quality control according to the present invention may allow automated, integrated image analysis.

In a further aspect of an embodiment of the present invention, a computer implemented method for determining focus quality for determining at least one digital image of a sample mounted on a slide is disclosed. The method may include the following method actions which, specifically, may be performed in the given order. Still, a different order is also possible. It is further possible to perform two or more of the method actions fully or partially simultaneously. Further, one or more or even all of the method actions may be performed once or may be performed repeatedly, such as repeated once or several times. Further, the method may comprise additional method actions which are not listed.

The method may include the following actions:

i) Determining a z-stack of digital images of the sample mounted on the slide using at least one imaging device of a slide imaging apparatus, wherein the imaging device comprises at least one transfer device having a focal length, wherein the z-stack comprises a plurality of digital images determined at least three different distances between the transfer device and the slide;

ii) Determining information about sharpness of a plurality of image regions of each of the digital images of the z-stack by using the computer-implemented method for quality control according to an embodiment of the present invention for quality control as described above or as described in more detail below;

iii) Generating a graphical indication of the information about sharpness as a function of distance for each of the image regions.

As outlined above, action ii) may include using the computer-implemented method for quality control accord-ing to an embodiment of the present invention for quality control as described above or as described in more detail below. Thus, for possible definitions, options or embodiments, reference may be made to the description given above.

The term "transfer device", as used herein, is a broad term and is to be given its ordinary and customary meaning to a person of ordinary skill in the art and is not to be limited to a special or customized meaning. The term specifically may refer, without limitation, to one or more optical elements having a focal length in response to an impinging light beam. The transfer device specifically may comprise one or more of: at least one lens, for example at least one lens selected from the group consisting of at least one refractive lense, at least one focus-tunable lens, at least one aspheric lens, at least one spheric lens, at least one Fresnel lens; at least one diffractive optical element; at least one multi-lens system. The term "focal length", as used herein, is a broad term and is to be given its ordinary and customary meaning to a person of ordinary skill in the art and is not to be limited to a special or customized meaning. The term specifically may refer, without limitation, to a distance over which incident collimated rays which may impinge the transfer device are brought into focus which may also be denoted as focal point. Thus, the focal length constitutes a measure of an ability of the transfer device to converge an impinging light beam.

The transfer device may constitute a coordinate system, wherein "z" is a coordinate along the optical axis. The coordinate system may be a polar coordinate system in which the optical axis of the transfer device forms a z-axis and in which a distance from the z-axis and a polar angle may be used as additional coordinates. A coordinate along the z-axis may be considered a longitudinal coordinate z.

The term "z-stack", as used herein, is a broad term and is to be given its ordinary and customary meaning to a person of ordinary skill in the art and is not to be limited to a special or customized meaning. The term specifically may refer, without limitation, to a set of at least three digital images imaged at least three different distances between the transfer device and the slide, i.e., at different z-levels. Specifically, two digital images may be determined in one layer above and one layer below the focus plane. The digital images of the z-stack may comprise high magnification views such as with a magnification of 20× or 40×.

Action i) may comprise imaging a first digital image by using the imaging device. Example, the first digital image may be imaging in a so-called seed focus plane which is a suggested optimal focus plane determined automatically by the slide imaging apparatus.

For example, the slide imaging apparatus may comprise at least one database in which information about the seed focus plane is stored.

For determining the z-stack each time two layers are added. For example, two additional digital images may be imaged in layers having a distance $\pm\varepsilon$ from the layer comprising the focal point with $\varepsilon$ being a positive number. Specifically, one digital image may be imaged above an image plane of the first digital image and one digital image may be imaged below the image plane of the first digital image. Said distances of the digital images of the z-stack may be defined on relative intensity and/or color changes determined in action b) of the method for quality control. Specifically, the distances may be defined such that the sharpness values of the digital images of two layers may differ in the region of interest.

The distances may be defined such that the sharpness values of the digital images of two layers may differ more than pre-determined tolerances such as more than at least 5%. The distances $\pm\varepsilon$ from the layer comprising the focal point may be chosen depending on accuracy. For example, the z-stack may comprise a plurality of digital images determined at distances $\varepsilon=1$ μm defined by the depth of field and by knowing the size of the object. Other values for distances $\varepsilon$ and/or non-equidistance distances are however feasible. In an example of a z-stack, the distances $\varepsilon$ may be 0.1 μm, 0.2 μm, 0.25 μm, 0.5 μm. Furthermore, 1, 3, 5, 7, 9, 11, 13 and 15 layers may be selected.

The term "focus quality", as used herein, is a broad term and is to be given its ordinary and customary meaning to a person of ordinary skill in the art and is not to be limited to a special or customized meaning. The term specifically may refer, without limitation, to a measure of amount of out-of-focus regions at different z-levels. For example, the focus quality may be determined to be good or suitable if the sharpness value is above a pre-defined threshold, wherein the focus quality may be determined bad or non-suitable otherwise. For example, the pre-defined threshold may be 15% of the maximum sharpness value.

The graphical indication may comprise sharpness values plotted against z-levels, in particular for a pre-defined number of samples. The determining of the information about sharpness and the generating of the graphical indication may be performed by using the at least one controlling and evaluation device.

The method may comprise adjusting a focus setting of the transfer device for different distances between the transfer device and the slide depending on the graphical indication. The procedure of adjusting the height of the focus mechanism assembly refers to an adjustment of depth-of-field. A height of the focus mechanism including a focus coil may be adjusted such that when it starts to focus at z=0 the highest average sharpness is obtained. A focus mechanism assembly comprising the transfer device may be set to its extrema without exceeding a specification level. In order to check the setting of the height of the nominal focus position of the focus coil, the focus coil is deactivated and a line trace is displayed from a focus camera. The line trace represents a received signal based on castellated optics. Accuracy of the displayed curve can signalize whether the height of the focus mechanism assembly including the focus coil and the transfer device is correctly adjusted. The line trace is acceptable if three colors of the upper horizontal bars are separated. In known devices, the focus mechanism assembly may be secured with screws and must be adjusted manually. An embodiment of the present invention proposes automatically adjusting the height of the focus mechanism assembly based on the quality control as described in various portions of the present application. Such an automated approach is particularly useful because the tests must be performed precisely and cost time. In contrast to the manual approach described in Kohlberger T, Liu Y, Moran M, et al. "Whole-Slide Image Focus Quality: Automatic Assessment and Impact on AI Cancer Detection", J Pathol Inform, 2019, wherein many tests had to be performed before an average measure of quality was achieved to define z=0 based on a strong "v" shaped trend based on out-of-focus classes against the z-levels, the method proposed by embodiments of the present invention is labor efficient due to automatization.

The adjustment of the focus setting to adjust the depth of field may be performed automatically. Specifically, the determination of the z-stack, the determination of the information about sharpness and the generation of the graphical indication may be performed automatically such as by using the at least one controlling and evaluation device.

The method may further comprise displaying the graphical indication such as by using the at least one user interface.

The method for determining focus quality according to an embodiment of the present invention, may allow reducing a statistical chance in getting an out-of-focus area at z=0. When optimally set, the predicted probability of blurring at z=0 should be the lowest possible value, but do to statistical deviations is not 0%.

In a further aspect of an embodiment of the present invention, a computer implemented method for determining a three-dimensional digital image of a sample mounted on a slide using at least one imaging device of a slide imaging apparatus is disclosed. The imaging device may include at least one transfer device having a focal length. The method may include the following method actions which, specifically, may be performed in the given order. Still, a different order is also possible. It is further possible to perform two or more of the method actions fully or partially simultaneously. Further, one or more or even all of the method actions may be performed once or may be performed repeatedly, such as repeated once or several times. Further, the method may comprise additional method actions which are not listed.

The method may include the following actions:

Determining a z-stack of two-dimensional digital images, wherein the z-stack is determined by imaging the sample at least three different distances between the slide and the transfer device starting in a seed focus plane, wherein the seed focus plane is a suggested optimal focus plane determined by the slide imaging apparatus, wherein a first two-dimensional image imaged in the seed focus plane has first sharpness values, wherein said distances are defined based on sharpness values determined by using the computer-implemented method for quality control according to an embodiment of the present invention for quality control as described above or as described in more detail below such that the sharpness values of two-dimensional digital images determined at the different distances differ from the first sharpness values and among each other;

Selecting the in-focus regions of each digital two-dimensional images of the z-stack by using the indication depending on the classification of the quality;

Determining the three-dimensional digital image by combining information about the seed focus plane and the in-focus regions of each digital two-dimensional images of the z-stack.

For possible definitions, options or embodiments, reference may be made to the description of the methods given above.

This method according to an embodiment of the present invention proposes the construction of a 3D image based on a z-stack with z=0 with the best focus value.

The digital images may be digital images at 20× or 40× magnification.

Said distances of the digital images of the z-stack may be defined on relative intensity and/or color changes determined in action b) of the method for quality control. Specifically, the distances may be defined such that the sharpness values of the digital images of two layers may differ in the region of interest. The distances may be defined such that the sharpness values of the digital images of two layers may differ more than pre-determined tolerances such as more than at least 5%. The distances ±ε from the layer comprising the focal point may be chosen depending on accuracy. For example, the z-stack may comprise a plurality of digital images determined at distances ε=1 μm defined by the depth of field and by knowing the size of the object. Other values for distances E and/or non-equidistance distances are however feasible. In an example of a z-stack, the distances E may be 0.1 μm, 0.2 μm, 0.25 μm, 0.5 μm. Furthermore, 1, 3, 5, 7, 9, 11, 13 and 15 layers may be selected.

The slight imaging apparatus may define for each slide a focus plane by picking a seed point, also denoted seeding point, based on a z-stack near the tallest vertical extension on the lower edge of the sample. As a consequence, the best focus plane, i.e., the seed plane, may be defined. The slight imaging apparatus may be configured for updating the focus plane during scanning of the digital images continuously based on data derived from a dynamic forward-looking focus tracking mechanism. Specifically, a split mirror and castellated optics may allow a focus camera next to the imaging camera to scan at the same time to define whether the signal is in focus. This information can be used directly to adjust the output of the dynamic focus coil in the focus mechanism assembly, adjusting the height of the transfer device. For each layer for the z-stack the forward-looking tracking mechanism may be applied.

The first action of the method may comprise imaging a first two-dimensional digital image in the seed plane and imaging at least two further two-dimension digital images in two different distances between the slide and the transfer device. In each of the two-dimensional digital images, due to the shallow depth of field, only regions of the respective digital image that lie on the same z plane are focused.

In the next action, all two-dimensional digital images may be analyzed, in particular by using the controlling and evaluation device, by selecting "sharp" image regions from each two-dimensional image. The term "in-focus region", as used herein, is a broad term and is to be given its ordinary and customary meaning to a person of ordinary skill in the art and is not to be limited to a special or customized meaning. The term specifically may refer, without limitation, to regions of the digital image having sharpness values above a pre-defined threshold. For example, the pre-defined threshold may be 15% of the maximum sharpness value. 3D information may be generated by depth from focus. Specifically, the three-dimensional image may be determined by combining the determined in-focus region and knowledge about the respective focus plane. Due to updating the focus plane during the scanning of the digital images, low out-of-plane resolutions can be largely avoided. By integrating the height information a reconstruction of the three-dimensional digital image can be carried out.

The method may further comprise displaying the three-dimensional digital image. The three-dimensional digital image may be displayed by using the at least one user interface.

The method may comprise coloring the three-dimensional digital image by applying the color information (e.g., a texture image) to individual voxels, 3D pixels, of the three-dimensional digital image. Via Texturing using x, y, and z coordinates a color may be defined to the pixels. This may enable a better object recognition through better reference comparison.

The method for determining a three-dimensional digital image according to an embodiment the present invention, may allow a proportionally non-labor-intensive process since two-dimensional images in opposite direction on the z-stack can be automatically added to the best seed focus plane at a distance depending on accuracy. Furthermore, a minimized part of the data set is shown by expanding the best seed focus plane. The accuracy of the image can be increased based on the described method of quality control by increasing the minimum threshold of sharpness values for each two-dimensional image.

In a further aspect of an embodiment of the present invention, a computer-implemented method for training a machine and deep learning model for analyzing at least one digital image of a sample mounted on a slide is disclosed. The method may include the following method actions which, specifically, may be performed in the given order. Still, a different order is also possible. It is further possible to perform two or more of the method actions fully or partially simultaneously. Further, one or more or even all of the method actions may be performed once or may be performed repeatedly, such as repeated once or several times. Further, the method may comprise additional method actions which are not listed.

The method may include generating at least one training data set. The generating of the training data set may include determining a z-stack of digital images by determining a plurality of digital images of a known sample mounted on the slide using at least one imaging device of a slide imaging apparatus. The known sample has at least one pre-determined or pre-defined feature. The imaging device may include at least one transfer device having a focal length. The z-stack may include a plurality of digital images determined at least three different distances between the transfer device and the slide, wherein said distances are defined based on sharpness values determined by using the computer-implemented method for quality control according to an embodiment of the present invention for quality control as described above or as described in more detail below such that the z-stack may include digital images determined out-off-focus of the transfer device and digital images determined in-focus of the transfer device. The method may include applying the machine learning model to the z-stack of digital images and adjusting the machine and deep learning model.

As an example, machine or deep learning with the highest focus values defined by the quality control as described in an embodiment of the present invention can be used to define critical features for an analysis, which may be obtained with the z-stack at z=0. The properties used by a machine or deep learning algorithm can be highlighted in a heat map. In addition, the defined properties may be trained on different z-stacks. In addition, lower focus values can also be included in the training of an algorithm by decreasing the minimum threshold of sharpness values. This may allow increasing the robustness of algorithms in relation to out-of-focus areas.

For possible definitions, options or embodiments, reference may be made to the description of the methods given above.

The term "machine and deep learning", as used herein, is a broad term and is to be given its ordinary and customary meaning to a person of ordinary skill in the art and is not to be limited to a special or customized meaning. The term specifically may refer, without limitation, to a method of using artificial intelligence (AI) for automatically model building of machine-learning models, in particular of prediction models. The controlling and evaluation device may be configured for performing and/or executing at least one machine and deep learning algorithm. The machine and deep learning model may be based on the results of the machine and deep learning algorithm. The machine and deep learning model may be based, for example, on a convolutional neural network and/or a regular neural network.

The term "training", as used herein, is a broad term and is to be given its ordinary and customary meaning to a person of ordinary skill in the art and is not to be limited to a special or customized meaning. The term specifically may refer, without limitation, to a process of determining parameters of the algorithm of machine and deep learning model on the training data set. The training may comprise at least one optimization or tuning process, wherein a best parameter combination is determined. The term "training data set", as used herein, is a broad term and is to be given its ordinary and customary meaning to a person of ordinary skill in the art and is not to be limited to a special or customized meaning. The term specifically may refer, without limitation, to a data set on which the machine and deep learning model is trained. The training data set may comprise a plurality of z-stacks of digital images. For training of the machine and deep learning model, the digital images may be used of known samples with at least one pre-determined or pre-defined feature. For example, the feature may comprise one or more of color, texture, morphometry, and topology.

For determining the z-stack every time digital images of at least two layers may be added; one layer above and one layer below. With respect to determining of the z-stack reference is made to the description of the determining of the z-stack of the method for determining focus quality and for determining a three-dimensional digital image. Up to what level these digital images can actually be used for training the algorithm can be defined during the training of the algorithm. For example, quality control values may be defined such as 95%, 90%, 85%, 80%, and 75% compared to the focus plane. These values may not be defined directly, but may be estimated indirectly by defining threshold values with the quality control tool. Hereby it's digital out-of-focus is not firstly defined or pre-defined, but the algorithm learns to deal with lower sharpness values.

The term "digital image out-off-focus of the transfer device", as used herein, is a broad term and is to be given its ordinary and customary meaning to a person of ordinary skill in the art and is not to be limited to a special or customized meaning. The term specifically may refer, without limitation, to a digital image having sharpness values below a pre-defined threshold. The threshold may be chosen such that the tissue with less contrast is also included in the image. For example, the threshold may be 15% of the maximum sharpness value. The term "digital image in-focus of the transfer device", as used herein, is a broad term and is to be given its ordinary and customary meaning to a person of ordinary skill in the art and is not to be limited to a special or customized meaning. The term specifically may refer, without limitation, to a digital image having sharpness values above a pre-defined threshold such as above the threshold described in this paragraph above.

The method according to an embodiment of the present invention may allow making trained machine and deep learning models more robust so that out of focus or less sharp areas can be handled up to a certain threshold based on extra training.

Further disclosed and proposed herein is a computer program including computer-executable instructions for performing at least one of the methods according to an embodiment of the present invention in one or more of the embodiments enclosed herein when the program is executed on a computer or computer network. Specifically, the computer program may be stored on a computer-readable data carrier and/or on a computer-readable storage medium.

As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method actions as indicated above may be performed by using a computer or a computer network and/or by using a computer program.

Further disclosed and proposed herein is a computer program product having program code means, in order to perform at least one of the methods according to the present invention in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute at least one of the methods according to one or more of the embodiments disclosed herein.

Further disclosed and proposed herein is a computer program product with program code means stored on a machine-readable carrier, in order to perform at least one of the methods according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing at least one of the methods according to one or more of the embodiments disclosed herein.

Referring to the computer-implemented aspects of the invention, one or more of the method actions or even all of the method actions of the methods according to one or more of the embodiments disclosed herein may be performed by using a computer or computer network. Thus, generally, any of the method actions including provision and/or manipulation of data may be performed by using a computer or computer network.

Generally, these method actions may include any of the method actions, typically except for method actions requiring manual work, such as providing the specimens and/or certain aspects of performing the actual measurements.

Specifically, further disclosed herein are:

a computer or computer network comprising at least one processor, wherein the processor is adapted to perform at least one of the methods according to one of the embodiments described in this description, a computer loadable data structure that is adapted to perform at least one of the methods according to one of the embodiments described in this description while the data structure is being executed on a computer, a computer program, wherein the computer program is adapted to perform at least one of the methods according to one of the embodiments described in this description while the program is being executed on a computer, a computer program comprising program means for performing at least one of the methods according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform at least one of the methods according to one of the embodiments described in this description after having been loaded into a main and/or working storage of a computer or of a computer network, and a computer program product having program code means, wherein the program code means can be stored or are stored on a storage medium, for performing at least one of the methods according to one of the embodiments described in this description, if the program code means are executed on a computer or on a computer network.

In a further aspect of an embodiment of the present invention, a slide imaging apparatus is disclosed. The slide imaging apparatus comprises At least one imaging device configured for generating at least one digital image of a sample mounted on a slide;

At least one controlling and evaluation device;

Wherein the slide imaging apparatus is configured for performing at least one of the methods according to an embodiment of the present invention as described above or as described in more detail below.

For possible definitions, options or embodiments of the slight imaging apparatus, reference may be made to the description of the methods given above.

Summarizing and without excluding further possible embodiments, the following embodiments may be envisaged:

Embodiment 1. A computer-implemented method for quality control of at least one digital image of a sample mounted on a slide, wherein the method comprises the following actions:

a) Providing at least one digital image of the sample mounted on the slide using at least one imaging device of a slide imaging apparatus;

b) Determining quality of the digital image by determining sharpness values of sub-regions of at least one region of interest of the digital image by using at least one edge detection image filter and comparing the sharpness values within the region of interest, wherein the quality of the region of interest is classified depending on the comparison;

c) Generating at least one indication depending on the classification of the quality, wherein actions b) and c) are performed automatically.

Embodiment 2. The method according to the preceding embodiment, wherein the indication is a graphical indication comprising a heating map, wherein the heating map is generated by mapping the sharpness values of the sub-regions as a function of their image coordinates.

Embodiment 3. The method according to the preceding embodiment, wherein the generating of the heating map comprises assigning a color value of a color space to each of the sharpness values.

Embodiment 4. The method according to the preceding embodiment, wherein the color space is the RGB color space, wherein the color space ranges from white 255 for high quality to black 0 for out-of-focus.

Embodiment 5. The method according to any one of the three the preceding embodiments, wherein the sub-regions correspond to pixels of the digital image, wherein the generating of the heating map comprises selecting groups of pixels of the region of interest, determining an average sharpness value for each of the groups of pixels of the region of interest and mapping the average sharpness value as a function of their image coordinates.

Embodiment 6. The method according to any one of the preceding embodiments, wherein the edge detection image filter is a Laplace filter.

Embodiment 7. The method according to any one of the preceding embodiments, wherein the sharpness value is a color gradient or intensity gradient.

Embodiment 8. The method according to any one of the preceding embodiments, wherein the region of interest is the whole digital image or a section of the digital image.

Embodiment 9. A computer-implemented method for determining focus quality for determining at least one digital image of a sample mounted on a slide, wherein the method comprises the following actions:

i) Determining a z-stack of digital images of the sample mounted on the slide using at least one imaging device of a slide imaging apparatus, wherein the imaging device comprises at least one transfer device having a focal length, wherein the z-stack comprises a plurality of digital images determined at least three different distances between the transfer device and the slide;

ii) Determining information about sharpness of a plurality of image regions of each of the digital images of the z-stack by using the computer-implemented method for quality control according to any one of the preceding embodiments;

iii) Generating a graphical indication of the information about sharpness as a function of distance for each of the image regions.

Embodiment 10. The method according to the preceding embodiment, wherein the method comprises adjusting a focus setting of the transfer device for different distances between the transfer device and the slide depending on the graphical indication.

Embodiment 11. A computer-implemented method for determining a three-dimensional digital image of a sample mounted on a slide using at least one imaging device of a slide imaging apparatus, wherein the imaging device comprises at least one transfer device having a focal length, wherein the method comprises the following actions:

Determining a z-stack of two-dimensional digital images, wherein the z-stack is determined by imaging the sample at least three different distances between the slide and the transfer device starting in a seed focus plane, wherein the seed focus plane is a suggested optimal focus plane determined by the slide imaging apparatus, wherein a first two-dimensional image imaged in the seed focus plane has first sharpness values, wherein said distances are defined based on sharpness values determined by using the computer-implemented method for quality control according to any one of the preceding embodiments referring to a method for quality control such that the sharpness values of two-dimensional digital images determined at the different distances differ from the first sharpness values and among each other;

Selecting in-focus regions of each digital two-dimensional images of the z-stack by using the indication depending on the classification of the quality;

Determining the three-dimensional digital image by combining information about the seed focus plane and the in-focus regions of each digital two-dimensional images of the z-stack.

Embodiment 12. The method according to the preceding embodiment, wherein the method comprises coloring the three-dimensional image by applying color information to pixels of the three-dimensional image.

Embodiment 13. A computer-implemented method for training a machine and deep learning model for analyzing at least one digital image of a sample mounted on a slide, wherein the method comprises generating at least one training data set, wherein the generating of the training data set comprises determining a z-stack of digital images by determining a plurality of digital images of a known sample mounted on the slide using at least one imaging device of a slide imaging apparatus, wherein the known sample has at least one pre-determined or pre-defined feature, wherein the imaging device comprises at least one transfer device having a focal length, wherein the z-stack comprises a plurality of digital images determined at least three different distances between the transfer device and the slide, wherein said distances are defined based on sharpness values determined by using the computer-implemented method for quality control according to any one of the preceding embodiments referring to a method for quality control such that the z-stack comprises digital images determined out-off-focus of the transfer device and digital images determined in-focus of the transfer device;

wherein the method comprises applying the machine and deep learning model to the z-stack of digital images and adjusting the machine and deep learning model.

Embodiment 14. The method according to the preceding embodiment, wherein the machine and deep learning model is based on a convolutional neural network and/or a regular neural network.

Embodiment 15. A slide imaging apparatus comprising

At least one imaging device configured for generating at least one digital image of a sample mounted on a slide;

At least one controlling and evaluation device;

wherein the slide imaging apparatus is configured for performing at least one of the methods according to embodiments 1 to 14.

BRIEF DESCRIPTION OF THE DRAWINGS

Further optional features and embodiments will be disclosed in more detail in the subsequent description of embodiments (e.g., in conjunction with the dependent claims).

Therein, the respective optional features may be realized in an isolated fashion as well as in any arbitrary feasible combination, as the skilled person will realize. The scope of the invention is not restricted by the preferred embodiments or any other embodiments. The embodiments are schematically depicted in the Figures. Therein, identical reference numbers in these Figures refer to identical or functionally comparable elements.

In the Figures:

Figure 1:
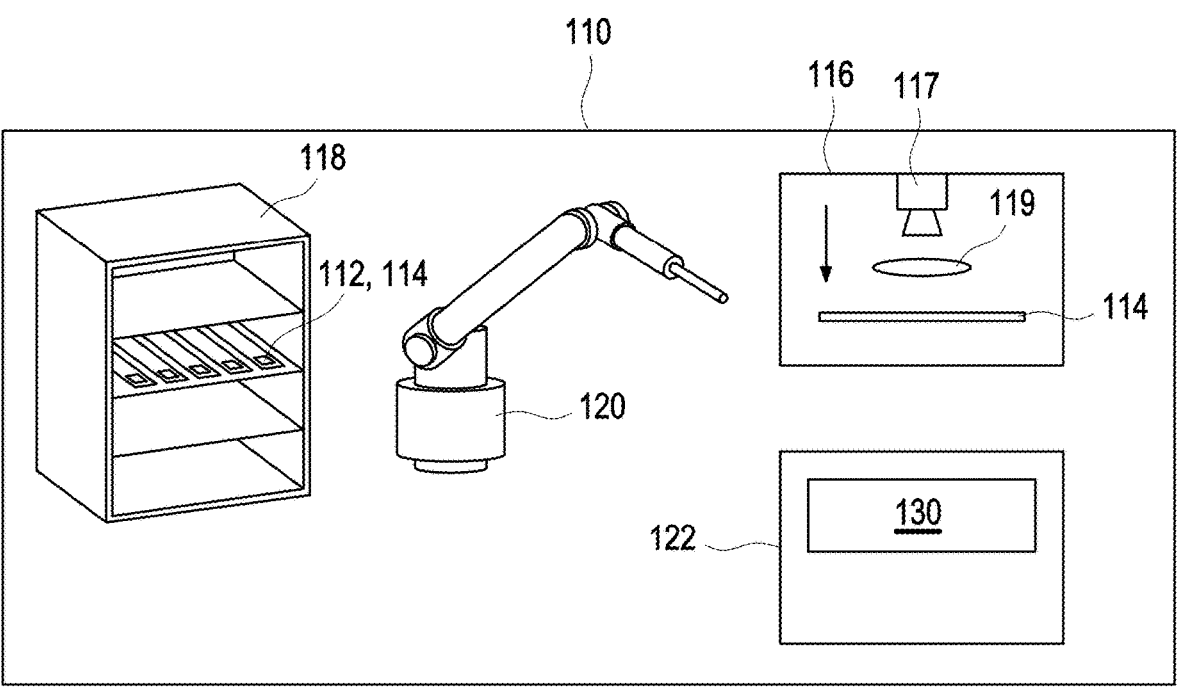
Figure 1:
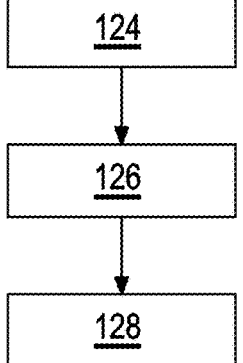
Figure 2:
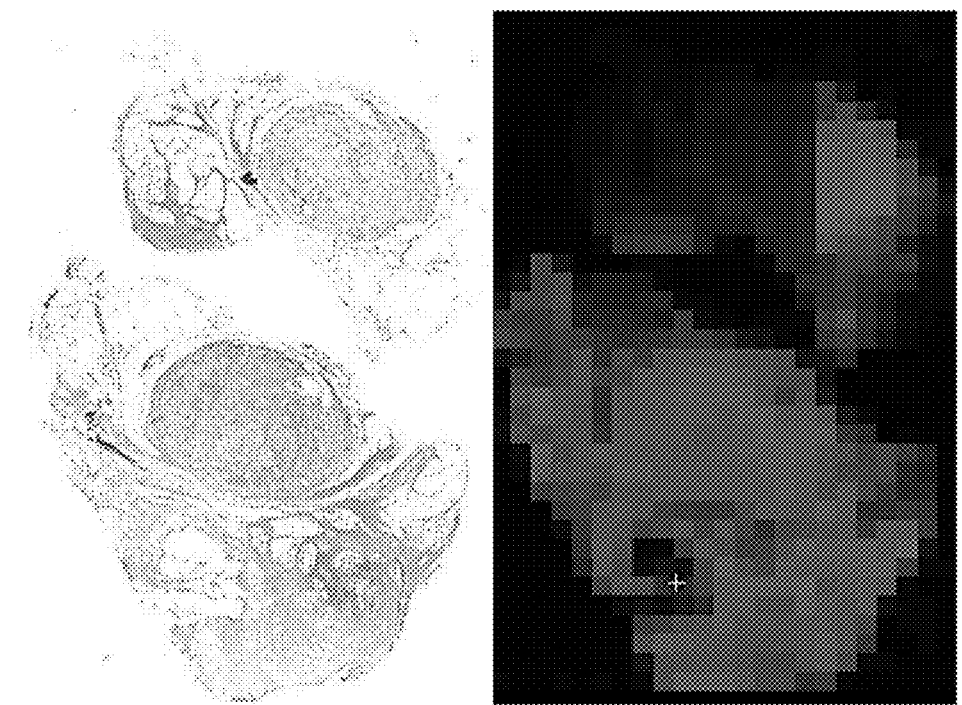
Figure 2:
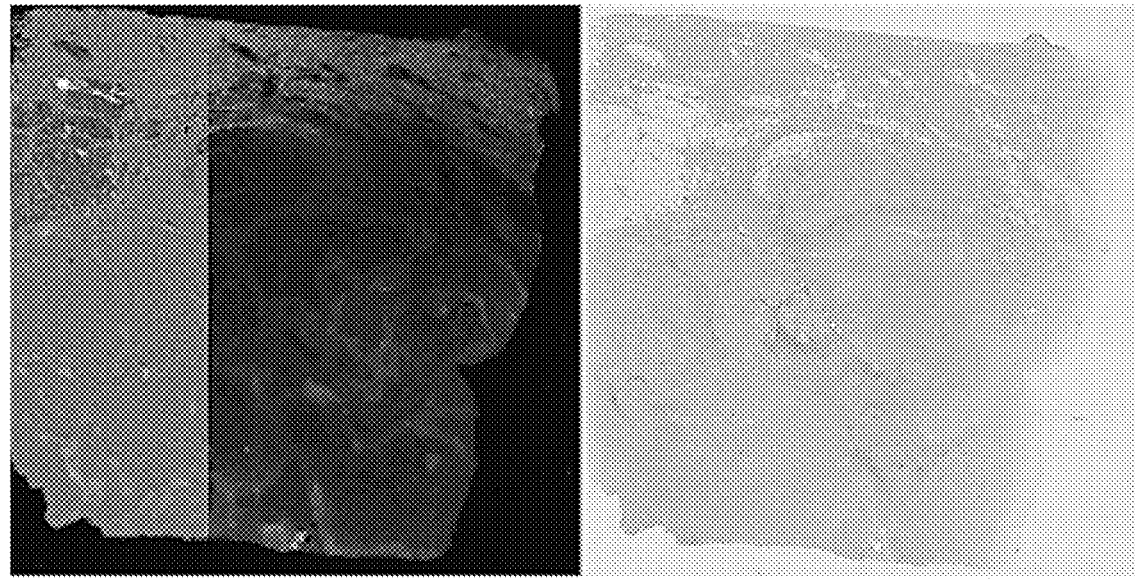
Figure 3:
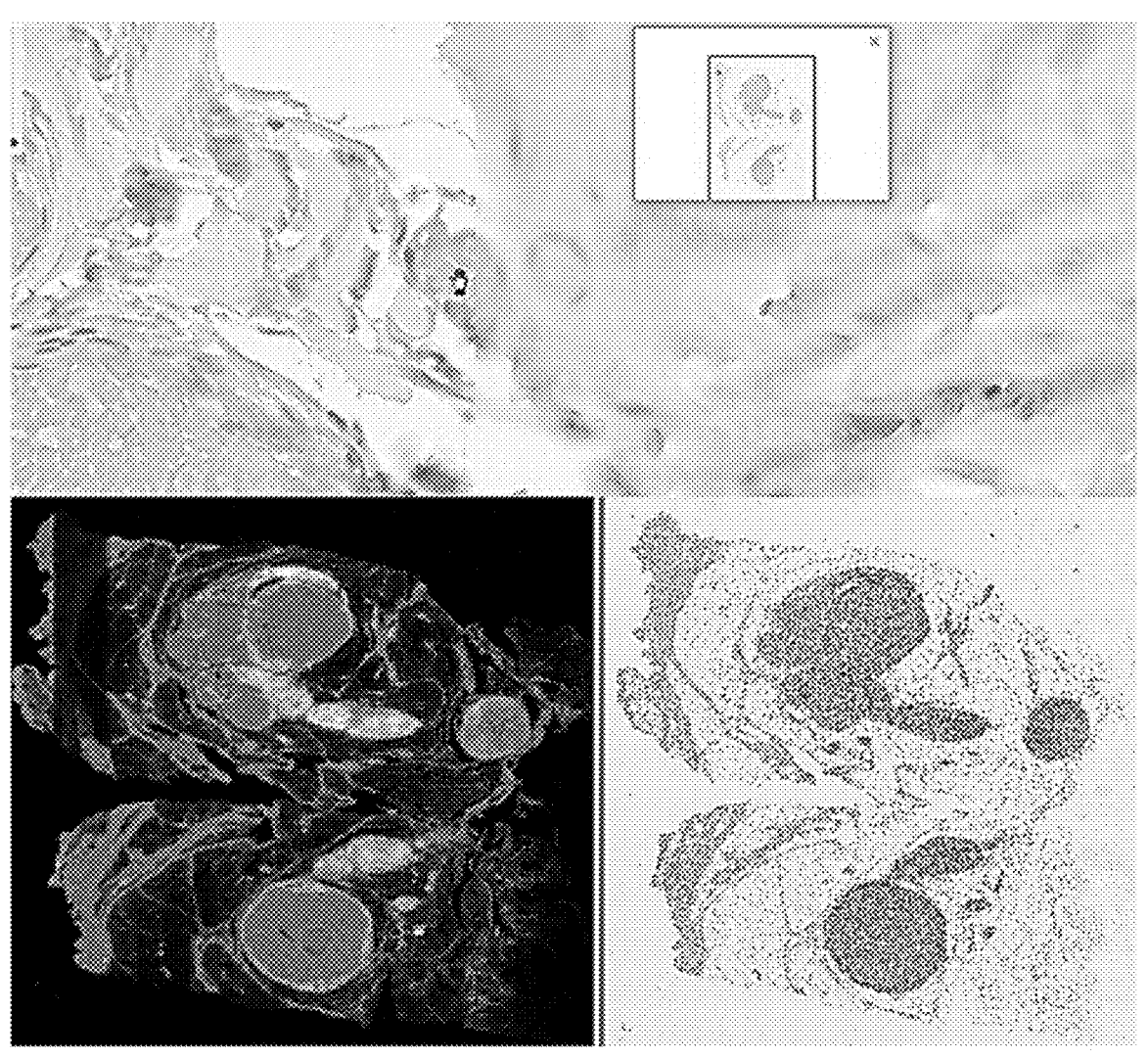
Figure 5:
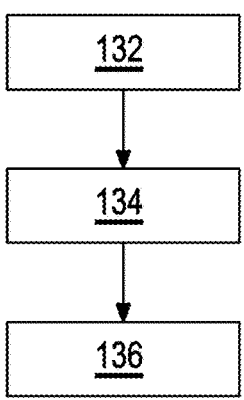
Figure 6:
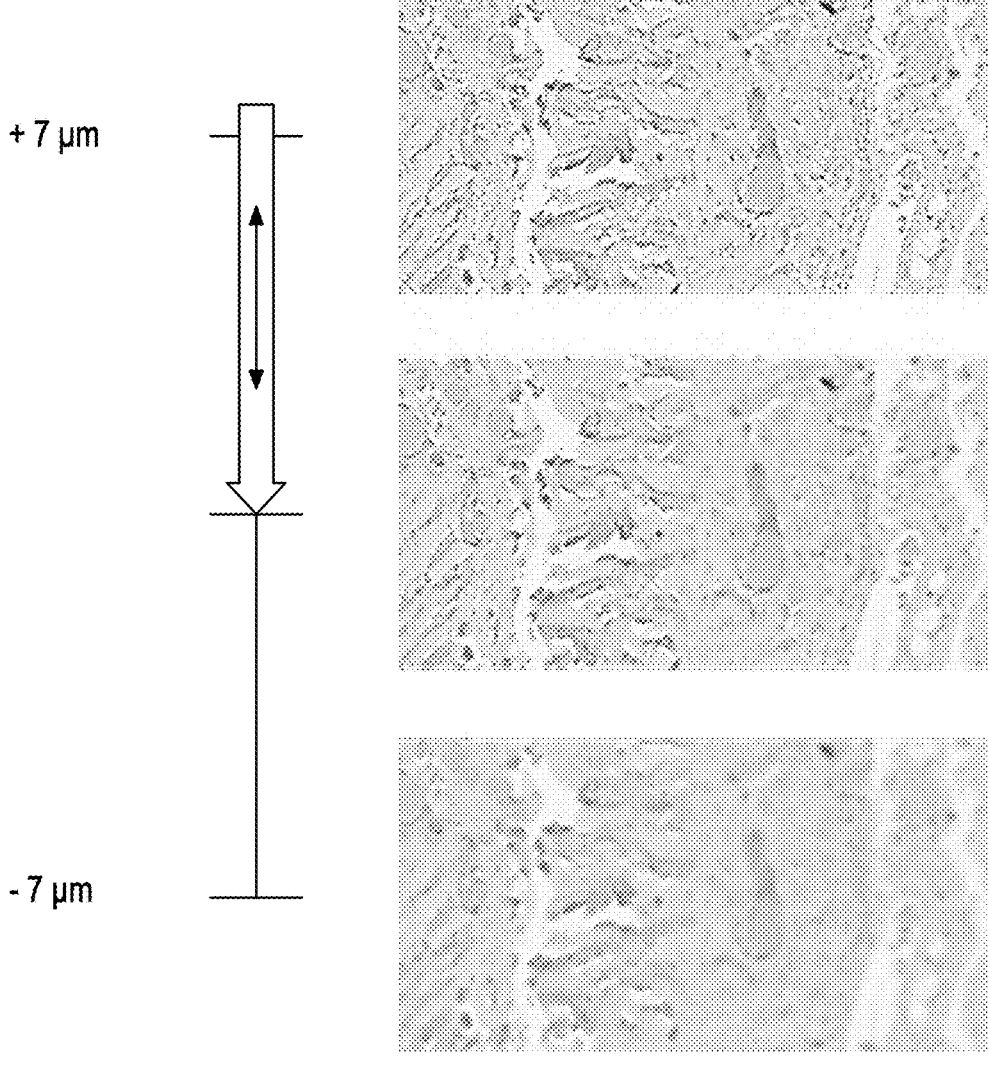
Figure 7:
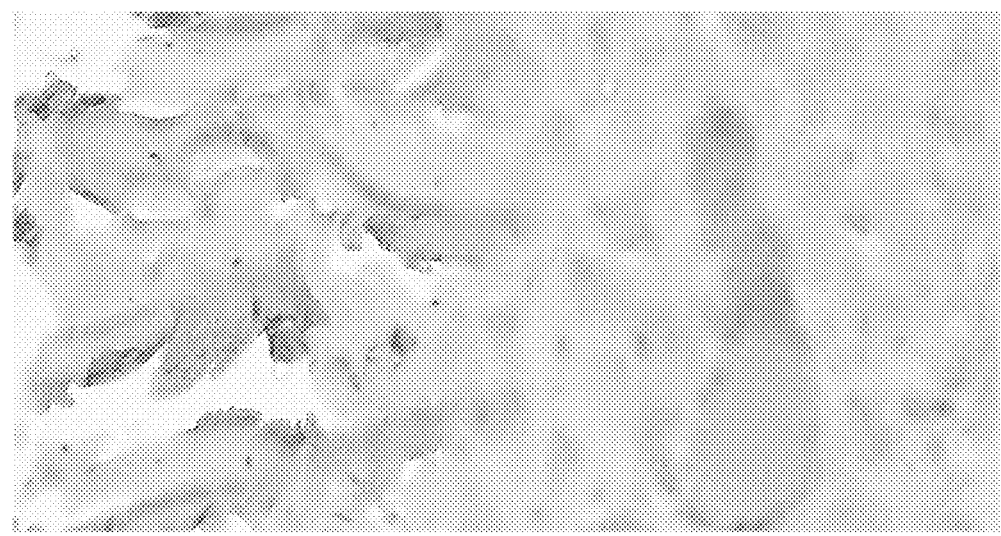
Figure 7:
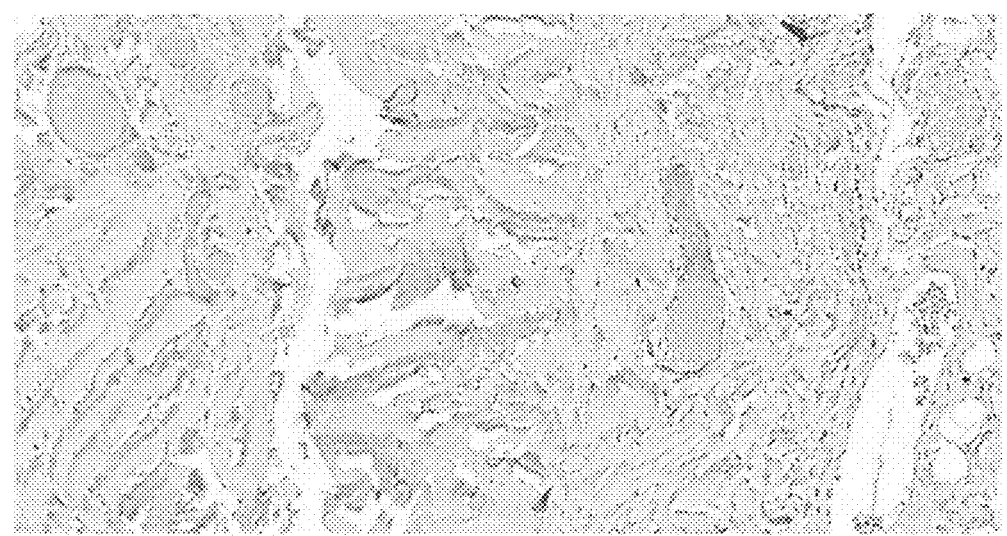
Figure 8:
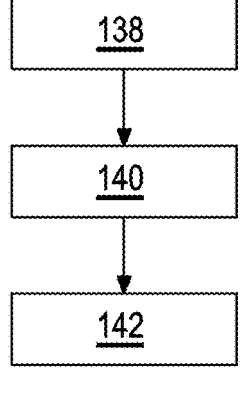
Figure 10:
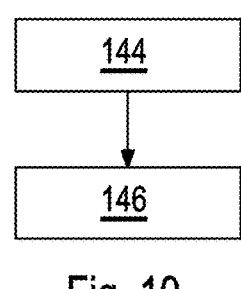
Figure 9:
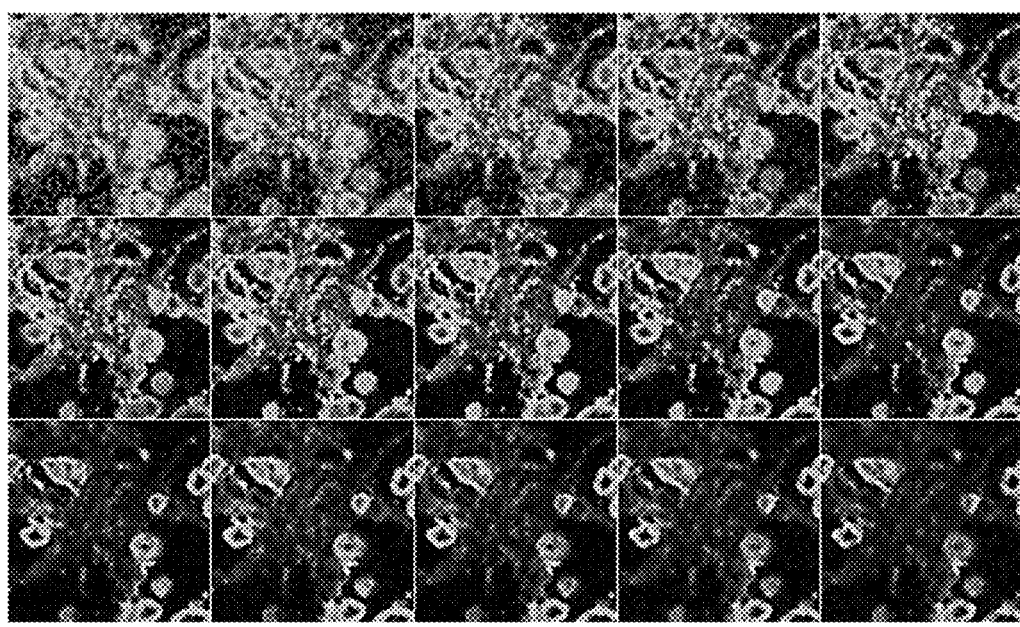
Figure 9:
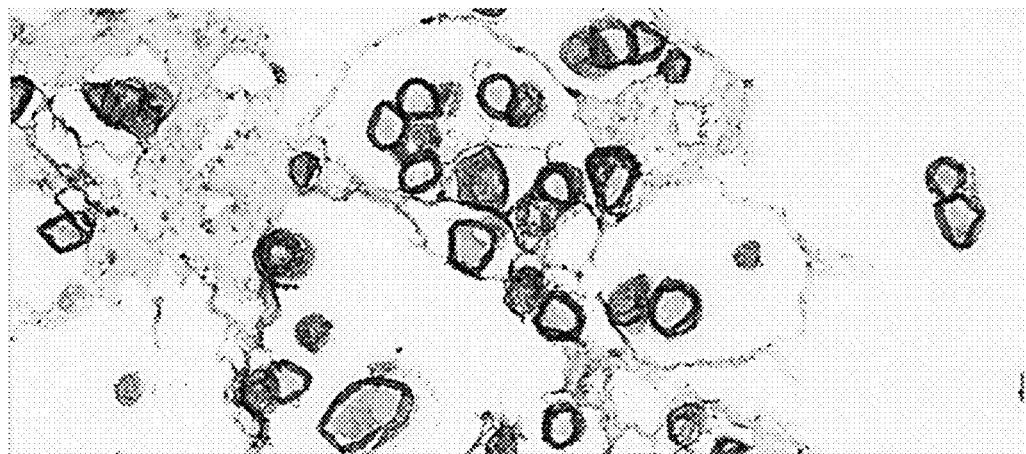
Figure 9:
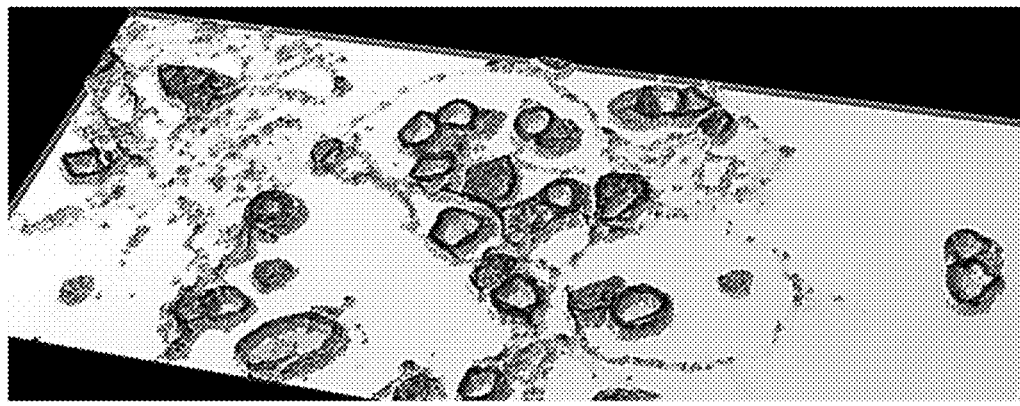
Figure 11:
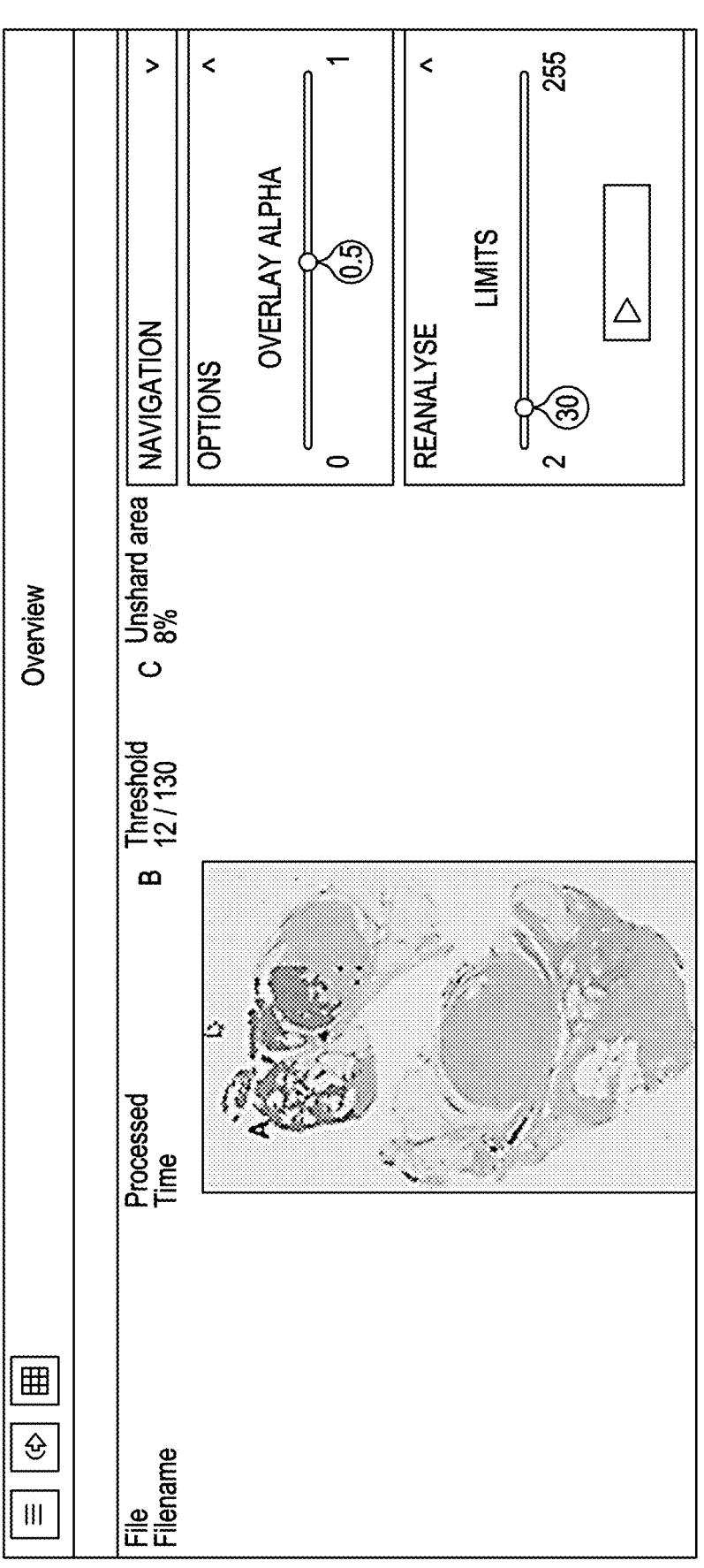

FIGS. 1A and 1B schematically illustrate an embodiment of a slide imaging apparatus and a flow chart of an embodiment of a method for quality control according to an embodiment of the present invention;

FIGS. 2A and 2B show experimental results;

FIG. 3 show experimental results;

FIGS. 4, 4A to 4F show experimental results;

FIG. 5 schematically illustrates a flow chart of an embodiment of a method for determining focus quality according to an embodiment of the present invention;

FIG. 6 shows experimental results;

FIGS. 7A and 7B show experimental results;

FIG. 8 schematically illustrates a flow chart of an embodiment of a method for determining a three-dimensional digital image according to an embodiment of the present invention;

FIGS. 9A to 9C show experimental results;

FIG. 10 schematically illustrates a flow chart of an embodiment of a method for training a machine and deep learning model according to an embodiment of the present invention; and FIG. 11 shows an overview of a program developed for quality control of a digital image of a tissue sample comprising a biological material.

DETAILED DESCRIPTION

FIG. 1A schematically illustrates an embodiment of a slide imaging apparatus 110 according to an embodiment of the present invention. The slide imaging apparatus 110 is configured for imaging a sample 112 mounted on a slide 114. The sample 112 may be a biological specimen, such as a tissue sample. The sample 112 may be or may comprise a biological material such as a tissue or a smear. However, other kinds of samples may also be feasible.

The slide 114 may be substrate which is designated for a sample 112 to be mounted on a surface of the slide. In particular for a purpose of carrying the sample 112 without any changes during the processing to the slide 114, the substrate is mechanically stable and can, therefore comprise any material which provides sufficient mechanical stability. In particular for a purpose of carrying a biological specimen, the substrate may exhibit a surface which is configured to be compatible with biological material. By way of example, the slide is a glass slide since glass is known, on one hand, to provide sufficient mechanical stability and, on the other hand, to have a high compatibility with biological material.

However, further kinds of materials for the slides 114 may also be feasible. For a purpose of generating the desired image of the sample, the slide 114 may be a plate having a 2D extension and a thickness, wherein the 2D extension of the plate may exhibit a rectangular or circular form, and wherein the thickness of the plate may be small compared to a size of the extension (e.g., 20% or less, 10% or less, 5% or less than a measure for a linear extent of the 2D extension of the plate).

The slide imaging apparatus 110 comprises the at least one imaging device 116. In particular, the imaging device 116 may be selected from a 2D camera 117 or a line scan detector. However, further kinds of imaging devices 116 may also be feasible. The slide 114 may, in particular, have a form which may enable imaging of the sample 112 mounted on the slide 114.

The imaging device 116 may comprise at least one transfer device 119. The transfer device 119 specifically may comprise one or more of at least one lens, for example at least one lens selected from the group consisting of at least one refractive lens, at least one focus-tunable lens, at least one aspheric lens, at least one spheric lens, at least one Fresnel lens; at least one diffractive optical element; at least one multi-lens system. The transfer device 119 has a focal length. The transfer device 119 may constitute a coordinate system, wherein "z" is a coordinate along the optical axis. The coordinate system may be a polar coordinate system in which the optical axis of the transfer device 119 forms a z-axis and in which a distance from the z-axis and a polar angle may be used as additional coordinates. A coordinate along the z-axis may be considered a longitudinal coordinate z.

The slide imaging apparatus 110 may comprise a storage device 118 which is loadable with a plurality of slides 114 and configured for storing the slides 114. The storage device 118 may be selected from a slide tray or a slide rack, however, further types of storage devices may also be feasible. The storage device 118 may be loadable with the at least one slide 114 (e.g., in a manual fashion), wherein, however, an automatic loading of the storage device 118 may also be conceivable. The slide imaging apparatus 110 may comprise a supply device 120 which is configured to supply the at least one slide 114 from the storage device 118 to the imaging device 116. For example, the supply device 120 may comprise a robotic arm.

The slide imaging apparatus 110 comprises at least one controlling and evaluation device 122. The at least one controlling and evaluation device 122 may comprise at least one data processing device having a software code stored thereon comprising a number of computer commands. The controlling and evaluation device 122 may provide one or more hardware elements for performing one or more of the named operations and/or may provide one or more processors with software running thereon for performing one or more of the named operations. The controlling and evaluation device 122 may comprise one or more programmable devices such as one or more computers, application-specific integrated circuits (ASICs), Digital Signal Processors (DSPs), or Field Programmable Gate Arrays (FPGAs) which are configured to perform actions b) and c). Additionally or alternatively, however, the controlling and evaluation device 122 may also fully or partially be embodied by hardware.

The slide imaging apparatus 110 is configured for performing a computer-implemented method for quality control of at least one digital image of a sample 112 mounted on a slide 114. FIG. 1B schematically illustrates a flow chart of an embodiment of the method for quality control according to an embodiment of the present invention.

The method may comprise determining a state of the digital image relating to suitability for being automatically analyzed. Specifically, the method may comprise determining an indication of an amount of sharpness or blurriness of the digital image.

The method comprises the following actions:

a) (denoted with reference number 124) Providing at least one digital image of the sample 112 mounted on the slide 114 using the at least one imaging device 116 of the slide imaging apparatus 110;

b) (denoted with reference number 126) Determining quality of the digital image by determining sharpness values of sub-regions of at least one region of interest of the digital image by using at least one edge detection image filter and comparing the sharpness values within the region of interest, wherein the quality of the region of interest is classified depending on the comparison;

c) (denoted with reference number 128) Generating at least one indication depending on the classification of the quality, wherein actions b) and c) are performed automatically.

The providing of the digital image may comprise imaging and/or generating the at least one digital image using the imaging device 116.

The region of interest may be an arbitrary shaped region or area of the digital image to be analyzed. The region of interest may be the whole digital image or a section of the digital image. The region of interest may be a region of the image comprising or suspected to comprise at least one feature to be analyzed. The digital image may be a pixelated image comprising a plurality of pixels, e.g. arranged in an array of pixels, such as a rectangular array, having m rows and n columns, with m, n, independently, being positive integers.

The region of interest may be or may comprise a group of pixels comprising an arbitrary number of pixels. The sub-region may be an arbitrary part or element, in particular image elements, of the region of interest comprising at least one pixel or a group of pixels. The sub-regions may be square areas of the region of interest. The region of interest may comprise a plurality of sub-regions such as a plurality of pixels.

The edge detection image filter may be or may comprise at least one image processing tool configured for identifying edges in the region of interest. The edge detection image filter may a Laplace filter. The Laplace filter may be based on second derivative of intensity and/or color value and, thus, may determine local extrema. The edge detection image filter may be configured for edge detection based on local extrema. In particular, the edge detection filter may emphasize strong edges and/or gradients. Specifically, the method may comprise defining at sub-region level (e.g., at pixel level) the sharpness of the digital image based on one parameter defined by the Laplace filter. The edge detection filter may be configured for assigning a gray value to each of the sub-regions depending on the respective local extremum. Using the Laplace filter may be advantageous since there is no need to rotate the kernel to get x or y directions like it is required with first derivate filters like Sobel or Canny filter. FIG. 2A shows an exemplary experimental result. The left part of FIG. 2A shows the scanned digital image and the right part shows square areas defined in gray values by the Laplace filter.

The sharpness value may be a local extremum of intensity and/or color value. The sharpness value may further refer to a color gradient or intensity gradient. The comparing of the sharpness values in action 126 may comprise comparing the local extrema of the sub-regions of the region of interest. The method may comprise determining a maximum local extremum of the region of interest. The maximum local extremum may be the highest local extremum of the sub-regions of the region of interest. The method may comprise a minimum local extremum of the region of interest. The minimum local extremum may be the lowest local extremum of the sub-regions of the region of interest. The method may comprise sorting the local extrema of the sub-regions in descending order starting with the maximum local extremum to the minimum local extremum. However, ascending sorting may be possible, too. The comparison may comprise at least one mathematical operation for determining relations of the local extrema.

The quality of the region of interest is classified depending on the comparison in action 126. The maximum local extremum may be classified as highest sharpness. The minimum local extremum may be classified as lowest sharpness. The local extrema of the sub-regions may be classified in descending order starting with the maximum local extremum to the minimum local extremum.

The method may further comprise setting an out-of-focus threshold. The out-of-focus threshold may define a minimum value for the maximum local extremum. For example, the out-of-focus threshold may be set to a high quality absolute sharpness which may be achieved in 99% of a set of controlled images as the minimum value for the maximum local extremum. In case the determined maximum local extremum of the region of interest is below the out-of-focus threshold the digital image may be rejected and/or classified as low quality. Using the out-of-focus threshold may allow preventing completely out-of-focus digital images from not being recognized.

In action 128, for example, the indication may be a graphical indication comprising a heating map, also denoted focus map. The heating map may be generated by mapping the sharpness values of the sub-regions as a function of their image coordinates. The generating of the heating map may comprise assigning a color value of a color space to each of the sharpness values. For example, the color space may be the RGB color space.

The RGB color space may be a color space having three color channels, i.e., one for red (R), one for green (G) and one blue (B). The color space may range from white 255 for high quality to black 0 for out-of-focus. Thus, the maximum value of 255 in white may represent the sharpest part of the digital image. The heating map may comprise only one or two colors such as only red and yellow color values with white 255 for high quality to black 0 for out-of-focus.

For example, the sub-regions may correspond to pixels of the digital image. The generating of the heating map may comprise selecting groups of pixels of the region of interest, determining an average sharpness value for each of the groups of pixels of the region of interest and mapping the average sharpness value as a function of their image coordinates. Specifically, the generating of the heating map may comprise determining an average gray value within groups of pixels. The average gray value may be determined by calculating a sum of all gray values divided by the number of sub-regions of the image region, in particular the number of pixels. For calculating the average gray value, black pixels may not be included or discarded. Black pixels may be pixels without any tissue contrast which cannot be sharp or blurred. Thus, the term pixel may refer to descriptive measurement values.

The determined quality based on the sharpness values may have a direct link to the applicability of classification algorithms used for computational pathology. The generated indication may allow identifying artifacts due to staining, tissue folding, and blurriness.

The method may comprise displayed the indication, in particular the heating map, by using at least one user interface 130. The user interface 130 may be a human-machine interface configured for displaying the indication such as a display, a screen and the like.

The completely automatic determining of the quality and generating of the indication may be superior in identifying out-of-focus regions and artifacts in comparison to control of the digital image with human eyes. FIG. 2B illustrates that with a naked eye the sharpness cannot be defined by looking at a high magnitude. The characterization of the sharpness of the digital image based on the analyzes of the Laplace filter at pixel level represented in the heating map according to an embodiment of the present invention is depicted on the left part of FIG. 2B. A corresponding thumbnail taken by the VENTANA® DP 200 slide scanner is shown on the right.

FIG. 3 shows further experimental results. At 40× magnification the blurriness can be detected, see top part. The heating map of the Laplace analysis at the pixel level according to embodiment of the present invention is displayed at the bottom on the left and a thumbnail view taken by the VENTANA® DP 200 slide scanner on the right.

Figure 4:
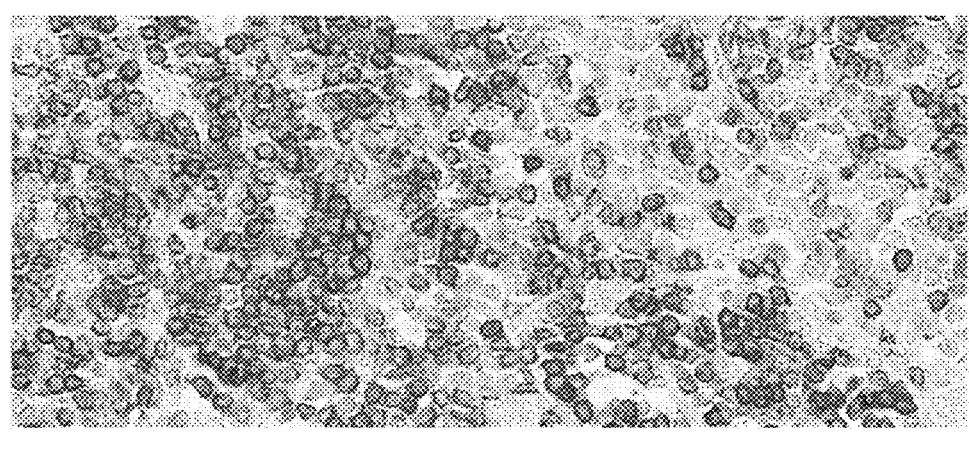
Figure 4:
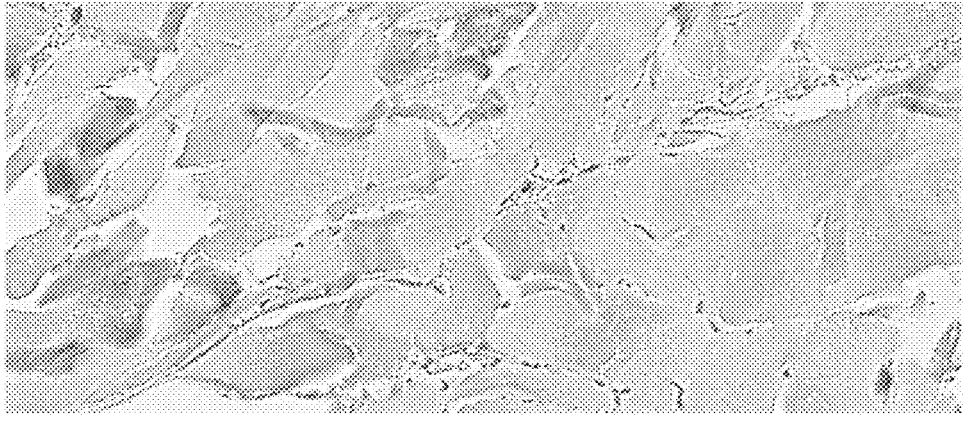
Figure 4:
Figure 4:
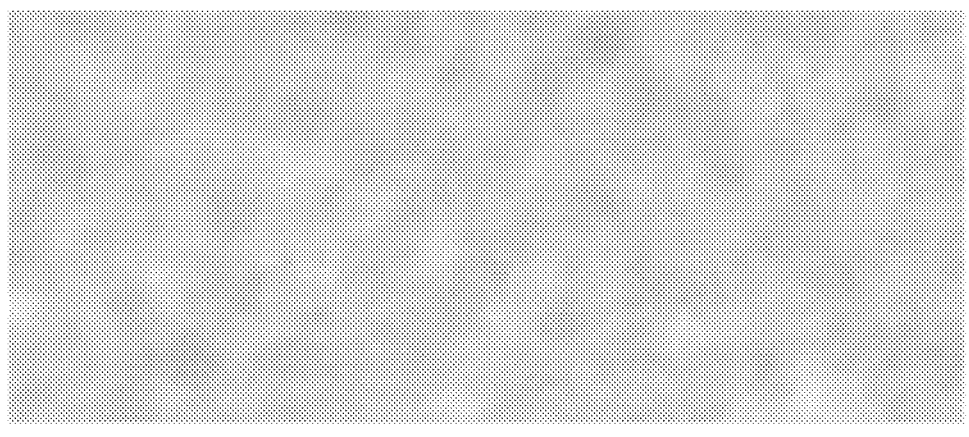

FIGS. 4A to 4F show further experimental results. FIG. 4 show different heating maps analyzed by the described Laplace filter at pixel level according to an embodiment of the present invention. FIG. 4A shows a detected air bubble in 40× magnification. FIG. 4B shows detected blurriness in 40× magnification due to a lack of tissue morphology causing a low contrast. FIG. 4C shows a detected sharp signal staining in 40× magnification. Due to a different staining of FIGS. 4D and 4E, which show the same area of the digital image, a lower or higher sharpness is detected in 40× magnification. FIG. 4F shows a region of the digital image, which has a low sharpness detected in 40× magnification.

FIG. 5 schematically illustrates a flow chart of an embodiment of a computer implemented method for determining focus quality for determining at least one digital image of a sample 112 mounted on a slide 114 according to an embodiment of the present invention.

The method comprises the following actions:

i) (denoted with reference number 132) Determining a z-stack of digital images of the sample 112 mounted on the slide 114 using the at least one imaging device 116 of the slide imaging apparatus 110, wherein the imaging device comprises at least one transfer device having a focal length, wherein the z-stack comprises a plurality of digital images determined at least three different distances between the transfer device 119 and the slide 114;

ii) (denoted with reference number 134) Determining information about sharpness of a plurality of image regions of each of the digital images of the z-stack by using the computer-implemented method for quality control according to an embodiment of the present invention for quality control as described above or as described in more detail below;

iii) (denoted with reference number 136) Generating a graphical indication of the information about sharpness as a function of distance for each of the image regions.

The z-stack comprises at least three digital images imaged at least three different distances between the transfer device 119 and the slide 114, i.e., at different z-levels. Specifically, two digital images may be determined in one layer above and one layer below the focus plane. The digital images of the z-stack may comprise high magnification views such as with a magnification of 20× or 40×.

Action i) 132 may comprise imaging a first digital image by using the imaging device 116. Example, the first digital image may be imaging in a so-called seed focus plane which is a suggested optimal focus plane determined automatically by the slide imaging apparatus 110. For example, the slide imaging apparatus 110 may comprise at least one database in which information about the seed focus plane is stored.

For determining the z-stack each time two layers are added. For example, two additional digital images may be imaged in layers having a distance ±ε from the layer comprising the focal point with E being a positive number. Specifically, one digital image may be imaged above an image plane of the first digital image and one digital image may be imaged below the image plane of the first digital image. The distances ±ε from the layer comprising the focal point may be chosen depending on accuracy. For example, the z-stack may comprise a plurality of digital images determined at distances $\varepsilon = 1$ μm defined by the depth of field and by knowing the size of the object. Other values for distances 6 and/or non-equidistance distances are however feasible. In an example of a z-stack, the distances E may be 0.1 μm, 0.2 μm, 0.25 μm, 0.5 μm. Furthermore, 1, 3, 5, 7, 9, 11, 13 and 15 layers may be selected.

The graphical indication may comprise sharpness values plotted against z-levels, in particular for a pre-defined number of samples. The determining of the information about sharpness and the generating of the graphical indication may be performed by using the at least one controlling and evaluation device 122.

The method may comprise adjusting a focus setting of the transfer device 119 for different distances between the transfer device 119 and the slide 114 depending on the graphical indication. A height of the focus mechanism including a focus coil may be adjusted such that when it starts to focus at z=0 the highest average sharpness is obtained. A focus mechanism assembly comprising transfer device 119 may be set to its extrema without exceeding a specification level. In order to check the setting of the height of the nominal focus position of the focus coil, the focus coil is deactivated and a line trace is displayed from a focus camera. The line trace represents a received signal based on castellated optics. Accuracy of the displayed curve can signalize whether the height of the focus mechanism assembly including the focus coil and the transfer device is correctly adjusted. The line trace is acceptable if three colors of the upper horizontal bars are separated. In known devices, the focus mechanism assembly may be secured with screws and must be adjusted manually. An embodiment of the present invention proposes automatically adjusting the height of the focus mechanism assembly based on the quality control as described in portions of this application. Such an automated approach is particularly useful because the tests must be performed precisely and cost time. In contrast to the manual approach described in Kohlberger T, Liu Y, Moran M, et al. "Whole-Slide Image Focus Quality: Automatic Assessment and Impact on AI Cancer Detection", J Pathol Inform, 2019, wherein many tests had to be performed before an average measure of quality was achieved to define z=0 based on a strong "v" shaped trend based on out-of-focus classes against the z-levels, the method proposed by embodiments of the present invention is labor efficient due to automatization.

The adjustment of the focus setting to adjust the depth of field may be performed automatically. Specifically, the determination of the z-stack, the determination of the information about sharpness and the generation of the graphical indication may be performed automatically such as by using the at least one controlling and evaluation device 122.

The method may further comprise displaying the graphical indication such as by using the at least one user interface 130.

FIG. 6 shows experimental results. In particular, generating of the z-stack comprising three digital images is depicted. One digital image above the seeding plane is imaged at +7 μm and one digital image below the seeding plane at −7 μm is imaged. In between the digital image imaged in the seeding plane is shown. The arrow indicates the transfer device 119 and the thin arrow variability on focal length.

FIGS. 7A and 7B show further experimental results. In FIG. 7A the initial default conditions with 40× magnification. In FIG. 7B the adapted default conditions are shown with 40× magnification.

FIG. 8 schematically illustrates a flow chart of an embodiment of a computer implemented method for determining a three-dimensional digital image of a sample 112 mounted on a slide 114 using the at least one imaging device 116 of the slide imaging apparatus 110 according to an embodiment of the present invention.

The method comprises the following actions:

(denoted with reference number 138) Determining a z-stack of two-dimensional digital images, wherein the z-stack is determined by imaging the sample 112 at least three different distances between the slide 114 and the transfer device 119 starting in a seed focus plane, wherein the seed focus plane is a suggested optimal focus plane determined by the slide imaging apparatus 110, wherein a first two-dimensional image imaged in the seed focus plane has first sharpness values, wherein said distances are defined based on sharpness values determined by using the computer-implemented method for quality control according to an embodiment of the present invention for quality control as described above or as described in more detail below such that the sharpness values of two-dimensional digital images determined at the different distances differ from the first sharpness values and among each other;

(denoted with reference number 140) Selecting the in-focus regions of each digital two-dimensional images of the z-stack by using the indication depending on the classification of the quality;

(denoted with reference number 142) Determining the three-dimensional digital image by combining information about the seed focus plane and the in-focus regions of each digital two-dimensional images of the z-stack.

Said distances of the digital images of the z-stack may be defined on relative intensity and/or color changes determined in action b) 126 of the method for quality control. Specifically, the distances may be defined such that the sharpness values of the digital images of two layers may differ in the region of interest. The distances may be defined such that the sharpness values of the digital images of two layers may differ more than pre-determined tolerances such as more than at least 5%. The distances ±ε from the layer comprising the focal point may be chosen depending on accuracy. For example, the z-stack may comprise a plurality of digital images determined at distances ε=1 μm defined by the depth of field and by knowing the size of the object. Other values for distances E and/or non-equidistance distances are however feasible. In an example of a z-stack, the distances E may be 0.1 μm, 0.2 μm, 0.25 μm, 0.5 μm. Furthermore, 1, 3, 5, 7, 9, 11, 13 and 15 layers may be selected.

The slight imaging apparatus 110 may define for each slide a focus plane by picking a seed point, also denoted seeding point, based on a z-stack near the tallest vertical extension on the lower edge of the sample. As a consequence, the best focus plane, i.e., the seed plane, may be defined. The slight imaging apparatus 110 may be configured for updating the focus plane during scanning of the digital images continuously based on data derived from a dynamic forward-looking focus tracking mechanism. Specifically, a split mirror and castellated optics allow a focus camera next to the imaging camera to scan at the same time to define whether the signal is in focus. This information is used directly to adjust the output of the dynamic focus coil in the focus mechanism assembly, adjusting the height of the transfer device 119.

The first action of the method 138 may comprise imaging a first two-dimensional digital image in the seed plane and imaging at least two further two-dimension digital images in two opposite directions between the slide 114 and the transfer device 119. In each of the two-dimensional digital images, due to the shallow depth of field, only regions of the respective digital image that lie on the same z plane are focused.

In the next action 140, all two-dimensional digital images may be analyzed, in particular by using the controlling and evaluation device, by selecting "sharp" image regions from each two-dimensional image. 3D information may be generated by depth from focus. Specifically, the three-dimensional image may be determined by combining the determined in-focus region and knowledge about the respective focus plane. Thus, by integrating the height information a reconstruction of the three-dimensional digital image can be carried out.

The method may further comprise displaying the three-dimensional digital image. The three-dimensional digital image may be displayed by using the at least one user interface 130.

The method may comprise coloring the three-dimensional digital image by applying the color information (e.g., a texture image) to individual voxels, 3D pixels, of the three-dimensional digital image. Via Texturing using x, y, and z coordinates a color may be defined to the pixels. This may enable a better object recognition through better reference comparison.

FIGS. 9A to 9C show experimental results. In FIG. 9A focus regions in digital images from top left (background) to bottom right (highest point of the sample) are shown from −7 to +7 in steps of 0.25 μm at a magnification of 40 times. FIG. 9B shows an exemplary two-dimensional analysis of VENTANA® HER2 (4B5) antibody intended for the semi-quantitative detection of transmembrane protein HER2. FIG. 9C shows the three-dimension image of VENTANA® HER2 (4B5) antibody intended for the semi-quantitative detection of transmembrane protein HER2 based on the z-stacks shown in FIG. 9A FIG. 10 schematically illustrates a flow chart of an embodiment of a computer-implemented method for training a machine and deep learning model for analyzing at least one digital image of a sample 112 mounted on a slide 114 according to an embodiment of the present invention.

The method comprises generating at least one training data set (denoted with reference number 144). The generating of the training data set comprises determining a z-stack of digital images by determining a plurality of digital images of a known sample 112 mounted on the slide using the imaging device 116. The known sample 112 has at least one pre-determined or pre-defined feature. The z-stack comprises a plurality of digital images determined at least three different distances between the transfer device 119 and the slide 114, wherein said distances are defined based on sharpness values determined by using the computer-implemented method for quality control according to an embodiment of the present invention for quality control as described above or as described in more detail below such that the z-stack comprises digital images determined out-off-focus of the transfer device and digital images determined in-focus of the transfer device.

The machine and deep learning model may be based, for example, on a convolutional neural network and/or a regular neural network.

The training may comprise a process of determining parameters of the algorithm of machine and deep learning model on the training data set. The training may comprise at least one optimization or tuning process, wherein a best parameter combination is determined. The training data set may comprise a plurality of z-stacks of digital images. For training of the machine and deep learning model, the digital images may be used of known samples with at least one pre-determined or pre-defined feature. For example, the feature may comprise one or more of color, texture, morphometry, and topology.

For determining the z-stack every time digital images of at least two layers may be added; one layer above and one layer below. With respect to determining of the z-stack reference is made to the description of the determining of the z-stack of the method for determining focus quality and for determining a three-dimensional digital image. Up to what level these digital images can actually be used for training the algorithm can be defined during the training of the algorithm. For example, quality control values may be defined such as 95%, 90%, 85%, 80%, and 75% compared to the focus plane. These values may not be defined directly, but may be estimated indirectly by defining threshold values with the quality control tool. Hereby it's digital out-of-focus is not firstly defined or pre-defined, but the algorithm learns to deal with lower sharpness values.

The method comprises applying (denoted with reference number 146) the machine learning model to the z-stack of digital images and adjusting the machine and deep learning model.

The method may allow making trained machine and deep learning models more robust so that out of focus or less sharp areas can be handled up to a certain threshold based on extra training.

As an example, machine or deep learning with the highest focus values defined by the quality control as described in this application can be used to define critical features for an analysis, which may be obtained with the z-stack at z=0. The properties used by a machine or deep learning algorithm can be highlighted in a heat map. In addition, the defined properties may be trained on different z-stacks. In addition, lower focus values can also be included in the training of an algorithm by decreasing the minimum threshold of sharpness values. This may allow increasing the robustness of algorithms in relation to out-of-focus areas.

FIG. 11 shows an overview of a program developed for quality control of a digital image of a tissue sample comprising a biological material according to embodiments of the present invention. The represented image of the tissue comprises a width of 77824 and a height of 115712 pixels. For the scanning, a magnification was chosen of 40× (0.2500 mpp). The focus was autofocus, the focus quality routine and the scan mode regular. For defining the focus quality, the quality control as described in this application was applied. Sub-Figure "A" represents the indication of "out-of-focus sub-regions" which would be represented in red in a heating map. Sub-Figure "B" shows Laplace out-of-focus threshold based on the red color channel of the RGB color space with the maximum value of 255 in white, for the highest sharpness values, to 0 in black, for out-of-focus. Sub-Figure "C" shows the percentage of out-of-focus pixels of a whole slide image.

LIST OF REFERENCE NUMBERS

110 slight imaging apparatus
112 Sample
114 Slide
116 imaging device
117 2D camera
118 storage device
119 transfer device
120 supply device
122 controlling and evaluation device
124 Providing at least one digital image
126 Determining quality of the digital image
128 Generating at least one indication
130 user interface
132 Determining a z-stack of digital images
134 Determining information about sharpness
136 Generating a graphical indication
138 Determining a z-stack of two-dimensional digital images
140 Selecting the in-focus regions
142 Determining the three-dimensional digital image
144 generating at least one training data set
146 Applying

The invention claimed is:

1. A computer-implemented method comprising:
accessing a z-stack comprising a plurality of digital images of a sample, wherein each digital image of the plurality of digital images is a two-dimensional image depicts a sample mounted on a slide and corresponds to a different focal distance between the slide and an at imaging device of a slide imaging apparatus;
determining, for each digital image in the z-stack, sharpness values of sub-regions of at least one region of interest of the digital image by using at least one edge detection image filter;
comparing the sharpness values for each sub-regions of the at least one region of interest across the plurality of digital images;
selecting in-focus regions of each digital images in the z-stack based on the comparison; and
generating a three-dimensional digital image based on the selected in-focus regions.

2. The method of claim 1, further comprising generating a graphical indication comprising a heating map, wherein the heating map is generated by mapping the sharpness values of the sub-regions as a function of their image coordinates.

3. The method of claim 2, wherein the generating of the heating map comprises assigning a color value of a color space to each of the sharpness values.

4. The method of claim 3, wherein the color space is an RGB color space, wherein the color space ranges from white 255 for high quality to black 0 for out-of-focus.

5. The method of claim 2, wherein the sub-regions correspond to pixels of the digital image, wherein the generating of the heating map comprises selecting groups of pixels of the region of interest, determining an average sharpness value for each of the groups of pixels of the region of interest and mapping the average sharpness value as a function of their image coordinates.

6. The method of claim 1, wherein the edge detection image filter is a Laplace filter.

7. The method of claim 1, wherein at least one of the sharpness values is a color gradient or intensity gradient.

8. The method of claim 1, wherein the region of interest is the whole digital image or a section of the digital image.

9. The method of claim 1, further comprising:
i) determining the z-stack, wherein the imaging device comprises at least one transfer device having a focal length, wherein the plurality of digital images is determined at at least three different distances between the transfer device and the slide;
determining information about the sharpness values of the sub-regions; and generating a graphical indication of the information about the sharpness values as a function of distance for each of the sub-regions.

10. The method of claim 9, further comprising: adjusting a focus setting of the transfer device for different distances between the transfer device and the slide depending on the graphical indication.

11. The computer-implemented method of claim 1, further comprising determining a seed plane within the z-stack, wherein the seed plane corresponds to a suggested optimal focal plane for the sample as determined by the slide imaging apparatus, and wherein the selection of the in-focus regions is performed with reference to the seed plane.

12. The method of claim 11, further comprising coloring the three-dimensional digital image by applying color information to pixels of the three-dimensional digital image.

13. A computer-implemented method for training a machine and deep learning model for analyzing at least one digital image of a sample mounted on a slide, wherein the method comprises:

accessing at least one training data set generated by determining a z-stack of digital images of a known sample mounted on the slide using at least one imaging device of a slide imaging apparatus, wherein the known sample has at least one pre-determined or pre-defined feature, wherein the imaging device comprises at least one transfer device having a focal length, wherein the z-stack comprises a plurality of digital images determined at at least three different distances between the transfer device and the slide, wherein said distances are defined based on sharpness values determined by using the computer-implemented method of claim 1; and applying the machine and deep learning model to the z-stack of the digital images and adjusting the machine and deep learning model.

14. The method of claim 13, wherein the machine and deep learning model is based on a convolutional neural network and/or a regular neural network.

15. A system comprising:

one or more data processors; and a non-transitory computer readable storage medium containing instructions which, when executed on the one or more data processors, cause the one or more data processors to perform a set of actions including:

accessing a z-stack comprising a plurality of digital images of a sample, wherein each digital image of the plurality of digital images is a two-dimensional image depicts a sample mounted on a slide and corresponds to a different focal distance between the slide and an imaging device of a slide imaging apparatus;

automatically determining, for each digital image in the z-stack, sharpness values of sub-regions of at least one region of interest of the digital image by using at least one edge detection image filters;

comparing the sharpness values for each sub-regions of the at least one region of interest across the plurality of digital images;

selecting in-focus regions of each digital images in the z-stack based on the comparison; and automatically generating a three-dimensional digital image based on the selected in-focus regions.

16. The system of claim 15, further comprising the imaging device.

17. The system of claim 15, wherein the slide imaging apparatus includes least one controlling and evaluation device.

18. The system of claim 15, wherein the set of actions further includes generating a graphical indication comprising a heating map, wherein the heating map is generated by mapping the sharpness values of the sub-regions as a function of their image coordinates.

19. The system of claim 18, wherein the generating of the heating map comprises assigning a color value of a color space to each of the sharpness values.

20. A computer-program product tangibly embodied in a non-transitory machine-readable storage medium, including instructions configured to cause one or more data processors to perform a set of actions including:

accessing a z-stack comprising a plurality of digital images of a sample, wherein each digital image of the plurality of digital images is a two-dimensional image depicts a sample mounted on a slide and corresponds to a different focal distance between the slide and an imaging device of a slide imaging apparatus;

automatically determining, for each digital image in the z-stack, sharpness values of sub-regions of at least one region of interest of the digital image by using at least one edge detection image filter;

comparing the sharpness values for each sub-regions of the at least one region of interest across the plurality of digital images;

selecting in-focus regions of each digital images in the z-stack based on the comparison; and automatically generating a three-dimensional digital image based on the selected in-focus regions.

* * * * *